US012624247B2

(12) United States Patent
Oh et al.

(10) Patent No.: US 12,624,247 B2
(45) Date of Patent: May 12, 2026

(54) FILM

(71) Applicant: LG CHEM, LTD., Seoul (KR)

(72) Inventors: Hyun Taek Oh, Daejeon (KR); Kwang Seung Park, Daejeon (KR); Chang Hoon Sin, Daejeon (KR)

(73) Assignee: LG CHEM, LTD., Seoul (KR)

( * ) Notice: Subject to any disclaimer, the term of this patent is extended or adjusted under 35 U.S.C. 154(b) by 1085 days.

(21) Appl. No.: 17/763,497

(22) PCT Filed: Dec. 18, 2020

(86) PCT No.: PCT/KR2020/018654
§ 371 (c)(1),
(2) Date: Mar. 24, 2022

(87) PCT Pub. No.: WO2021/125876
PCT Pub. Date: Jun. 24, 2021

(65) Prior Publication Data
US 2022/0332976 A1 Oct. 20, 2022

(30) Foreign Application Priority Data

Dec. 20, 2019 (KR) ........................ 10-2019-0171331
Dec. 18, 2020 (KR) ........................ 10-2020-0178179

(51) Int. Cl.
| | |
|---|---|
| *C09D 183/06* | (2006.01) |
| *C08F 283/12* | (2006.01) |
| *C08J 5/18* | (2006.01) |
| *G02B 1/04* | (2006.01) |

(52) U.S. Cl.
CPC ........ *C09D 183/06* (2013.01); *C08F 283/124* (2013.01); *C08J 5/18* (2013.01); *G02B 1/04* (2013.01)

(58) Field of Classification Search
CPC .......... C08J 5/18; C08F 283/124; G02B 1/04
See application file for complete search history.

(56) References Cited

U.S. PATENT DOCUMENTS

| | | | |
|---|---|---|---|
| 2006/0099385 A1 | 5/2006 | Onozawa et al. | |
| 2009/0252932 A1 | 10/2009 | Kitano et al. | |
| 2013/0155517 A1 | 6/2013 | Park et al. | |
| 2016/0370505 A1 | 12/2016 | Koo et al. | |
| 2018/0305547 A1 | 10/2018 | Dogen et al. | |
| 2019/0384094 A1* | 12/2019 | Lee ..................... G02F 1/13475 |
| 2020/0316826 A1 | 10/2020 | Hosokawa et al. | |
| 2021/0040330 A1 | 2/2021 | Byun et al. | |
| 2021/0199860 A1 | 7/2021 | Usa et al. | |

FOREIGN PATENT DOCUMENTS

| | | | | |
|---|---|---|---|---|
| CN | 1772825 A | 5/2006 | | |
| CN | 101080467 A | 11/2007 | | |
| JP | H04-080007 A | 3/1992 | | |
| JP | H08-132455 A | 5/1996 | | |
| JP | H11-326611 A | 11/1999 | | |
| JP | 2004-341553 A | 12/2004 | | |
| JP | 2007-047722 A | 2/2007 | | |
| JP | 2009-037046 A | 2/2009 | | |
| JP | 2011-143672 A | 7/2011 | | |
| JP | 2011-189625 A | 9/2011 | | |
| JP | 4952910 B2 | 6/2012 | | |
| JP | 2013-151609 A | 8/2013 | | |
| JP | 2014-047300 A | 3/2014 | | |
| JP | 2015-138150 A | 7/2015 | | |
| JP | 2017-033032 A | 2/2017 | | |
| JP | 2017-047594 A | 3/2017 | | |
| JP | 2018-519369 A | 7/2018 | | |
| JP | 2019-070718 A | 5/2019 | | |
| JP | 2019-147923 A | 9/2019 | | |
| KR | 10-2007-0086122 A | 8/2007 | | |
| KR | 10-2015-0045325 A | 4/2015 | | |
| KR | 10-2016-0149847 A | 12/2016 | | |
| KR | 10-2017-0053399 A | 5/2017 | | |
| KR | 10-2017-0080092 A | 7/2017 | | |
| KR | 10-2018-0072714 A | 6/2018 | | |
| KR | 10-2019-0132231 A | 11/2019 | | |
| WO | 2005-064367 A1 | 7/2005 | | |
| WO | WO-2018199722 A1* | 11/2018 | ............ B32B 27/06 |
| WO | 2019070073 A1 | 4/2019 | | |
| WO | 2019/146494 A1 | 8/2019 | | |

OTHER PUBLICATIONS

International Search Report issued for International Application No. PCT/KR2020/018654 on Apr. 1, 2021, 4 pages.

* cited by examiner

*Primary Examiner* — Kregg T Brooks
*Assistant Examiner* — David R. Foss
(74) *Attorney, Agent, or Firm* — ROTHWELL, FIGG, ERNST & MANBECK, P.C.

(57) ABSTRACT

The present application relates to a film. The present application can provide a film having excellent optical characteristics such as transparency or haze, mechanical properties such as hardness, and flexibility, wherein the shape of the surface is controlled to be suitable for various uses, and the controlled surface shape has excellent durability.

19 Claims, No Drawings

FILM

This application is a 35 U.S.C. 371 National Phase Entry Application from PCT/KR2020/018654 filed on Dec. 18, 2020, which claims the benefits of the filing dates of Korean Patent Application No. 10-2019-0171331, filed on Dec. 20, 2019, in the Korean Intellectual Property Office, and of Korean Patent Application No. 10-2020-0178179, filed on Dec. 18, 2020, in the Korean Intellectual Property Office, all of the disclosures of which are incorporated by reference herein in their entirety.

TECHNICAL FIELD

The present application relates to a film.

BACKGROUND OF THE INVENTION

A transparent resin film has excellent optical characteristics and has properties that are difficult to break compared to glass, so that it can be considered as a glass substitute.

As a method of producing a transparent resin film, a method also called a so-called cell casting method, such as a method of injecting a curable composition into cells and then curing it or a method of flow casting a curable composition on a steel belt and curing it, is known.

The cell casting method is known in Patent Document 1 or the like, but this method cannot continuously produce the film, and the efficiency is not good.

The method of flow casting a curable composition on a steel belt and curing it is known in Patent Document 2 or the like, but in this method, it is difficult to produce a film having uniform physical properties.

BRIEF SUMMARY OF THE INVENTION

The present application aims to provide a film. It is one aspect of the present application to provide a film having excellent optical characteristics such as transparency or haze, mechanical properties such as hardness, and flexibility, wherein the shape of the surface is controlled to be suitable for various uses, and the controlled surface shape has excellent durability.

DETAILED DESCRIPTION OF THE INVENTION

Among physical properties referred to in this specification, the physical properties that the measurement temperature and/or the measurement pressure affect the results are the results measured at room temperature and/or normal pressure, unless otherwise specified.

The term room temperature is a natural temperature without warming or cooling, which means, for example, any one temperature in a range of 10° C. to 30° C., or a temperature of 23° C. or about 25° C. or so. Also, in this specification, the unit of temperature is Celsius (° C.), unless otherwise specified.

The term normal pressure is a natural pressure without pressurizing or depressurizing, which means, usually, about 1 atm or so of atmospheric pressure.

In this specification, in the case of physical properties in which the measurement humidity affects the results, the relevant physical properties are the physical properties measured at natural humidity which is not particularly controlled at the room temperature and/or normal pressure state.

In the present application, the term alkyl group, alkylene group or alkoxy group may mean a linear or branched alkyl group, alkylene group or alkoxy group, having 1 to 20 carbon atoms, 1 to 16 carbon atoms, 1 to 12 carbon atoms, 1 to 8 carbon atoms or 1 to 4 carbon atoms, or may mean a cyclic alkyl group, alkylene group or alkoxy group, having 3 to 20 carbon atoms, 3 to 16 carbon atoms, 3 to 12 carbon atoms, 3 to 8 carbon atoms or 3 to 6 carbon atoms, unless otherwise specified.

In the present application, the term alkenyl group may mean a linear or branched alkenyl group having 2 to 20 carbon atoms, 2 to 16 carbon atoms, 2 to 12 carbon atoms, 2 to 8 carbon atoms or 2 to 4 carbon atoms, or may mean a cyclic alkenyl group having 3 to 20 carbon atoms, 3 to 16 carbon atoms, 3 to 12 carbon atoms, 3 to 8 carbon atoms or 1 to 6 carbon atoms, unless otherwise specified.

In the present application, the term aryl group or arylene group may mean an aryl group or arylene group, having 6 to 24 carbon atoms, 6 to 18 carbon atoms or 6 to 12 carbon atoms, or may mean a phenyl group or a phenylene group, unless otherwise specified.

In the present application, the term epoxy group may mean a monovalent residue derived from cyclic ether having three ring constituent atoms or a compound comprising the cyclic ether, unless otherwise specified. The epoxy group may be exemplified by a glycidyl group, an epoxyalkyl group, a glycidoxyalkyl group or an alicyclic epoxy group, and the like. Here, the alicyclic epoxy group may mean a monovalent residue derived from a compound containing an aliphatic hydrocarbon ring structure and including a structure in which two carbon atoms forming the aliphatic hydrocarbon ring also form an epoxy group. As the alicyclic epoxy group, an alicyclic epoxy group having 6 to 12 carbons may be exemplified, and for example, a 3,4-epoxycyclohexylethyl group and the like may be exemplified.

The alkyl group, alkylene group, alkoxy group, alkenyl group, aryl group, arylene group or epoxy group may also be optionally substituted with one or more substituents.

The present application relates to a film. In one example, the film may comprise a cured material layer. The cured material layer may be a cured material layer of an energy beam-curable composition. The film may have a single-layer structure including only the cured material layer, or may have a multi-layer structure including additional other layers. For example, the film may further comprise a base film, and in this case, the cured material layer may be formed on one side or both sides of the base film.

At least one side of the cured material layer may be an uneven surface. For example, when the cured material layer is formed on one side of the base film, the surface of the cured material layer opposite to the surface facing the base film may be an uneven surface. The shape of such an uneven surface may be variously controlled according to the purpose.

For example, the uneven surface may have arithmetic mean roughness (Ra) in a range of about 0.01 μm to 2 μm. The arithmetic mean roughness may be arithmetic mean roughness for the uneven surface before or after performing a steel wool test to be described below. The uneven surface may be a surface integrated with the cured material layer. This means that the uneven surface is not formed by a separate layer different from the cured material layer, and the relevant uneven surface is formed on the cured material layer itself.

The arithmetic mean roughness can be identified according to KS B 0601 standard or ISO 4287/1 standard. In another example, this arithmetic mean roughness may be 0.05 μm or more, 0.1 μm or more, 0.15 μm or more, 0.2 μm or more, 0.25 μm or more, or 0.3 μm or more, or may also be 1.8 μm or less, 1.6 μm or less, 1.4 μm or less, 1.2 μm or less, 1 μm or less, 0.9 μm or less, 0.8 μm or less, 0.7 μm or less, 0.6 μm or less, 0.5 μm or less, or 0.4 μm or less or so.

In one example, the uneven surface may be an uneven surface forming a so-called anti-glare surface.

The uneven surface may exhibit haze in a range of 3% to 50%. The haze may be haze on the uneven surface before or after performing a steel wool test to be described below. The haze may be measured by the manner disclosed in Examples to be described below. In another example, the haze may be 3.5% or more, 4% or more, 4.5% or more, 5% or more, 5.5% or more, 6% or more, 6.5% or more, 7% or more, 7.5% or more, 8% or more, 8.5% or more, 9% or more, 9.5% or more, 10% or more, 10.5% or more, 11% or more, 11.5% or more, 12% or more, 12.5% or more, 13% or more, 13.5% or more, 14% or more, 14.5% or more, 15% or more, 15.5% or more, 16% or more, 16.5% or more, 17% or more, 17.5% or more, 18% or more, 18.5% or more, 19% or more, 19.5% or more, 20% or more, 20.5% or more, or 21% or more, or may also be 45% or less, 40% or less, 35% or less, 30% or less, 25% or less, 20% or less, 15% or less, 10% or less, or 7% or less or so.

The uneven surface may be a surface having 60-degree gloss in a range of 10% to 90%. The 60-degree gloss may be 60-degree gloss on the uneven surface before or after performing a steel wool test to be described below. The 60-degree gloss may be measured in the manner disclosed in Examples to be described below. In another example, the 60-degree gloss may be 15% or more, 20% or more, 25% or more, 30% or more, 35% or more, 40% or more, 45% or more, 50% or more, 55% or more, 60% or more, or 65% or more, or may also be 85% or less, 80% or less, 75% or less, 70% or less, 65% or less, 60% or less, 55% or less, or 50% or less or so.

The uneven surface may exhibit excellent surface characteristics.

For example, the uneven surface may exhibit pencil hardness of 5H or more. The pencil hardness may be measured by a method of drawing a pencil lead on the uneven surface of the film with a load of 500 g and an angle of 45 degrees at a temperature of about 25° C. and 50% relative humidity using a pencil hardness measuring instrument, according to JIS 5600 standard. The pencil hardness can be measured by increasing the hardness of the pencil lead stepwise until the occurrence of defects such as indentations, scratches or ruptures on the uneven surface of the film is confirmed. In another example, the pencil hardness of the uneven surface may be approximately 6H or more, 7H or more, 8H or more, or 9H or more. The maximum value of the pencil hardness confirmed according to the known method of measuring pencil hardness is 9H. Therefore, the upper limit of the pencil hardness of the uneven surface may be 9H.

The uneven surface may exhibit 500 g steel wool resistance of 1,500 times or more. Here, the 500 g steel wool resistance is surface characteristics identified in a steel wool test. In another example, the 500 g steel wool resistance of the uneven surface of the film may be approximately 2,000 times or more, 2,500 times or more, 3,000 times or more, 3,500 times or more, 4,000 times or more, 4,500 times or more, 5,000 times or more, 5,500 times or more, 6,000 times or more, 6,500 times or more, 7,000 times or more, 7,500 times or more, 8,000 times or more, 8,500 times or more, 9,000 times or more, or 9,500 times or more. Since it means that the higher the numerical value of the steel wool resistance, the uneven surface of the film exhibits more excellent scratch resistance, the upper limit thereof is not particularly limited. In one example, the 500 g steel wool resistance may be 20,000 times or less or so, 15,000 times or less or so, 14,000 times or less or so, 13,000 times or less or so, 12,000 times or less or so, or 11,000 times or less or so.

In the film of the present application, the uneven surface thus formed may exhibit durability capable of stably maintaining its shape.

For example, the uneven surface may satisfy any one of the following equations 1 to 3, two of the equations, or all of the equations.

$$0.3 \geq \Delta H = 100 \times |(H_A - H_I)/N| \qquad \text{[Equation 1]}$$

$$0.3 \geq \Delta G = 100 \times |(G_A - G_I)/N| \qquad \text{[Equation 2]}$$

$$0.3 \geq \Delta R = 100 \times |(R_A - R_I)/N| \qquad \text{[Equation 3]}$$

In Equations 1 to 3, $\Delta H$, $\Delta G$ and $\Delta R$ are the change rate of haze, the change rate of 60-degree gloss and the change rate of arithmetic mean roughness (Ra) of the uneven surface, respectively.

In Equation 1, $H_I$ is the initial haze (haze before performing a steel wool test as described below) of the uneven surface, $H_A$ is the haze of the uneven surface after performing the steel wool test as described below, N is the number of times that the steel wool test has been performed, and $|(H_A - H_I)/N|$ is the absolute value of the numerical value obtained by substituting the $H_A$, $H_I$ and N into $(H_A - H_I)/N$.

In Equation 2, $G_I$ is the initial 60-degree gloss (60-degree gloss before performing the steel wool test as described below) of the uneven surface, $G_A$ is the 60-degree gloss of the uneven surface after performing the steel wool test as described below, N is the number of times that the steel wool test has been performed, and $|(G_A - G_I)/N|$ is the absolute value of the numerical value obtained by substituting the $G_A$, $G_I$ and N into $(G_A - G_I)/N$.

In Equation 3, $R_I$ is the initial arithmetic mean roughness (Ra) (arithmetic mean roughness before performing the steel wool test as described below) of the uneven surface, $R_A$ is the arithmetic mean roughness (Ra) of the uneven surface after performing the steel wool test described below, N is the number of times that the steel wool test has been performed, and $|(R_A - R_I)/N|$ is the absolute value of the numerical value obtained by substituting the $R_A$, $R_I$ and N into $(R_A - R_I)/N$.

The steel wool test performed for identification of Equations 1 to 3 above is performed by a method of scratching the uneven surface with a steel wool of grade #0000 under a load of 500 g, according to the method described in Examples to be described below. The scratch may be performed N times, which is a variable in Equations 1 to 3 above. In this case, N may be, for example, 1,000 or more, 1,100 or more, 1,200 or more, 1,300 or more, 1,400 or more, or 1,500 or more, or may be 3,000 or less, 2,900 or less, 2,800 or less, 2,700 or less, 2,600 or less, 2,500 or less, 2,400 or less, 2,300 or less, 2,200 or less, 2,100 or less, 2,000 or less, 1,900 or less, 1,800 or less, 1,700 or less, 1,600 or less, or 1,500 or less or so.

In another example, $\Delta H$ in Equation 1 may also be about 0.25 or less, about 0.2 or less, about 0.15 or less, about 0.1 or less, about 0.09 or less, about 0.08 or less, about 0.07 or less, about 0.06 or less, about 0.05 or less, about 0.04 or less, about 0.03 or less, about 0.02 or less, or about 0.01 or less or so. Because it means that the lower the value of the $\Delta H$ is, the better the holding power of the uneven surface is, the lower limit thereof is not particularly limited. In one example, the $\Delta H$ may be 0 or more, or more than 0 or so.

In another example, ΔG in Equation 2 may also be about 0.25 or less, about 0.2 or less, about 0.15 or less, about 0.1 or less, about 0.09 or less, about 0.08 or less, about 0.07 or less, about 0.06 or less, about 0.05 or less, about 0.04 or less, about 0.03 or less, or about 0.02 or less or so. Because it means that the lower the value of the ΔG is, the better the holding power of the uneven surface is, the lower limit thereof is not particularly limited. In one example, the ΔG may be 0 or more, or more than 0 or so.

In another example, ΔR in Equation 3 may also be about 0.25 or less, about 0.2 or less, about 0.15 or less, about 0.1 or less, about 0.09 or less, about 0.08 or less, about 0.07 or less, about 0.065 or less, about 0.06 or less, about 0.055 or less, about 0.05 or less, about 0.045 or less, about 0.04 or less, about 0.035 or less, about 0.03 or less, about 0.025 or less, about 0.02 or less, about 0.015 or less, about 0.01 or less, about 0.009 or less, about 0.008 or less, about 0.007 or less, about 0.006 or less, about 0.005 or less, or about 0.004 or less or so. Because it means that the lower the value of the ΔR is, the better the retention force of the uneven surface is, the lower limit thereof is not particularly limited. In one example, the ΔR may be 0 or more, or more than 0 or so.

In order to form an uneven surface showing shape retention force that satisfies one or more of Equations 1 to 3 above while showing one or more physical properties selected from the group consisting of the arithmetic mean roughness (Ra), haze, 60-degree gloss, pencil hardness and 500 g steel wool resistance, so-called skewness of the uneven surface can be adjusted. The skewness is a value indicating the degree to which a distribution deviates from symmetry and is biased to one side, and with regard to the uneven surface, it is a value indicating the symmetry degree of the surface height to the average plane. When the skewness is positive, it means that peaks constituting the uneven surface are dominant, and when it is negative, it means that valleys constituting the uneven surface are dominant. This skewness can be identified using a known optical profiler or AFM (atomic force microscope) instrument, and the like, according to ISO 25178 standard.

The present inventors have confirmed that the desired characteristics of the uneven surface can be implemented by making the skewness of the uneven surface as identified by ISO 25178 standard have a negative value. The skewness may be, for example, about −2 or more and less than 0. In another example, the skewness may be about −1.9 or more, about −1.8 or more, about −1.7 or more, about −1.6 or more, about −1.5 or more, about −1.4 or more, about −1.3 or more, about −1.2 or more, about −1.1 or more, about −1.0 or more, or about −0.9 or more, or may be −0.1 or less, about −0.2 or less, about −0.3 or less, about −0.4 or less, or about −0.5 or less. As the skewness is adjusted to show this range, it is possible to form an uneven surface in which the shape implemented according to the purpose is stably maintained.

In order to secure this skewness, a process of using a so-called anti-glare film as a template to transfer the uneven shape of the film to the cured material layer is required. That is, the uneven surface formed according to the known method of forming the known uneven surface with the so-called anti-glare film exhibits positive skewness, so that the surface, to which the surface with this positive skewness has been transferred in an inverse phase, can exhibit negative skewness. Also, in the process of being transferred to the reverse phase, the absolute value of the skewness is maintained in a similar range and the sign changes, so that by controlling the skewness of the uneven surface used as the template, it is possible to form the uneven surface showing the absolute value of the desired skewness in the negative region.

Accordingly, the cured material layer may be formed through a step of irradiating an energy beam-curable composition layer with energy beams in a state where the energy beam-curable composition layer is in contact with the anti-glare film. In this way, the cured material layer that satisfies the above-mentioned properties can be formed. Here, the energy beam-curable composition layer is a layer formed using an energy beam-curable composition, which may mean, for example, a layer formed by coating or casting the energy beam-curable composition on the base film.

The term energy beam-curable composition means a composition cured by irradiation with energy beams. In the category of the term energy beams, particle beams such as alpha-particle beams, proton beams and neutron beams, as well as microwaves, infrared (IR), ultraviolet (UV), X-rays and gamma rays, and the like may be included. Typically, ultraviolet rays or electron beams are used as energy beams.

The term anti-glare film means a film including a surface formed to exhibit low reflectance for at least a partial region of visible light or the entire visible light region. The surface formed to exhibit low reflectance may be referred to as an anti-glare surface.

The anti-glare surface of the anti-glare film may have various shapes, but generally has an uneven surface having a certain level of roughness, and the uneven surface of the anti-glare surface formed in a known manner has positive skewness. In a state where the uneven surface of such an anti-glare film is in contact with the energy beam-curable composition layer, the energy beam-curable composition may be cured by irradiating the layer with energy beams, thereby forming a film having an uneven surface that satisfies the desired physical properties.

Through the above process, the uneven surface of the anti-glare film may be transferred to the surface of the cured material layer, where the uneven surface thus transferred increases availability of the cured material layer. For example, the cured material layer to which the uneven surface is transferred may exhibit low reflectance for a part or all of the visible light region by itself, or may be combined with a necessary layer to exhibit the low reflectance. Therefore, such a cured material layer can be effectively applied in various applications requiring low reflectance together with the excellent physical properties as described above.

In the above process, the anti-glare surface in contact with the energy beam-curable composition layer may be an uneven surface as described above, and such an uneven surface may be an uneven surface showing positive skewness. The uneven surface may also be identified by ISO 25178 standard. The uneven surface of the anti-glare film may be more than 0 and about 2 or less. In another example, the skewness may be about 1.9 or less, about 1.8 or less, about 1.7 or less, about 1.6 or less, about 1.5 or less, about 1.4 or less, about 1.3 or less, about 1.2 or less, about 1.1 or less, about 1.0 or less, or about 0.9 or less, or may be 0.1 or more, about 0.2 or more, about 0.3 or more, about 0.4 or more, or about 0.5 or more. By applying the uneven surface with the skewness in this range, the uneven surface with the desired skewness may be formed.

The uneven surface of the anti-glare surface in contact with the energy beam-curable composition layer may have arithmetic mean roughness (Ra) in a range of about 0.01 μm to 2 μm. Through application of the anti-glare surface, which is the uneven surface having arithmetic mean roughness in such a range, it may be possible to produce a cured material layer having the desired physical properties. The arithmetic mean roughness can be measured in the manner disclosed in Examples to be described below. In another example, this arithmetic mean roughness may be 0.05 μm or more, 0.1 μm or more, 0.15 μm or more, 0.2 μm or more, or 0.25 μm or more, or may also be 1.8 μm or less, 1.6 μm or less, 1.4 μm or less, 1.2 μm or less, 1 μm or less, 0.9 μm or less, 0.8 μm or less, 0.7 μm or less, 0.6 μm or less, 0.5 μm or less, or 0.4 μm or less or so.

The anti-glare surface in contact with the energy beam-curable composition layer may be a surface having 60-degree gloss in a range of 10% to 90%. Through application of the anti-glare surface, which is the uneven surface having 60-degree gloss in such a range, it may be possible to produce a cured material layer having the desired physical properties. The 60-degree gloss can be measured in the manner disclosed in Examples to be described below. In another example, this 60-degree gloss may be 15% or more, 20% or more, 25% or more, 30% or more, 35% or more, 40% or more, or 45% or more, or may also be 85% or less, 80% or less, 75% or less, or 70% or less or so.

The anti-glare surface in contact with the energy beam-curable composition layer may be a surface exhibiting haze of 3% to 50%. Through application of the anti-glare surface, which is the uneven surface having haze in such a range, it may be possible to produce a cured material layer having the desired physical properties. The haze can be measured in the manner disclosed in Examples to be described below. In another example, this haze may be 3.5% or more, 4% or more, or 4.5% or more, or may also be 45% or less, 40% or less, 35% or less, 30% or less, or 25% or less or so.

The type of the applicable anti-glare film in the present application is not particularly limited, and for example, an anti-glare film having an uneven surface having the afore-mentioned haze, 60-degree gloss and/or arithmetic mean roughness Ra can be applied.

In a suitable example, as the anti-glare film, a film having an anti-glare layer including a binder resin and particles may be used.

At this time, as the binder resin, a heat or energy beam-curable binder resin may be applied, and a specific example thereof is not particularly limited, but it may be advanta-geous in terms of a process to apply an energy beam-curable binder resin. The type of the usable energy beam-curable binder resin is not particularly limited, but a non-urethane-based polyfunctional acrylate compound may be applied to secure an appropriate effect. For example, as the compound, a compound having two or more curable functional groups (e.g., (meth)acryloyloxy group, etc.) may be applied. The number of functional groups in the compound may also be 10 or less, 9 or less, 8 or less, 7 or less, 6 or less, 5 or less, 4 or less, or 3 or less or so. As such a compound, a polyfunctional acrylate compound, such as a bifunctional acrylate such as 1,4-butanediol di(meth)acrylate, 1,6-hexanediol di(meth)acrylate, neopentyl glycol di(meth)acry-late, polyethylene glycol di(meth)acrylate, neopentylglycol adipate di(meth)acrylate, hydroxyl pivalic acid neopen-tylglycol di(meth)acrylate, dicyclopentanyl di(meth)acry-late, caprolactone modified dicyclopentenyl di(meth)acry-late, ethylene oxide modified di(meth)acrylate, di(meth) acryloxy ethyl isocyanurate, allylated cyclohexyl di(meth) acrylate, tricyclodecane dimethanol (meth)acrylate, dimethylol dicyclopentane di(meth)acrylate, ethylene oxide modified hexahydrophthalic acid di(meth)acrylate, tricyclo-decane dimethanol (meth)acrylate, neopentylglycol modi-fied trimethylpropane di(meth)acrylate, adamantane di(meth)acrylate or 9,9-bis[4-(2-acryloyloxyethoxy)phenyl] fluorene; a trifunctional acrylate such as trimethylolpropane tri(meth)acrylate, dipentaerythritol tri(meth)acrylate, propi-onic acid modified dipentaerythritol tri(meth)acrylate, pen-taerythritol tri(meth)acrylate or propylene oxide modified trimethylolpropane tri(meth)acrylate; a tetrafunctional acry-late such as diglycerin tetra(meth)acrylate or pentaerythritol tetra(meth)acrylate; a pentafunctional acrylate such as pro-pionic acid modified dipentaerythritol penta(meth)acrylate; and a hexafunctional acrylate such as dipentaerythritol hexa (meth)acrylate or caprolactone modified dipentaerythritol hexa(meth)acrylate, can be used, and among the foregoing, one or two or more selected and used in consideration of the desired viscosity and physical properties.

The anti-glare layer, in which the curable binder resin is coated in a state mixed with particles, and cured by a curing method according to the type of the resin, may be applied. There is no particular limitation on the types of the appli-cable particles, and for example, organic polymer particles such as PMMA (poly(methyl methacraylte)) particles or PS (polystyrene) particles or silica particles or inorganic par-ticles such as zirconia particles, alumina particles or titania particles, and the like can be applied. There is no particular limitation on the shape, average particle diameter and/or ratio of the particles, and particles having an appropriate shape and/or average particle diameter can be applied at an appropriate ratio in consideration of the desired 60-degree gloss or haze, arithmetic mean roughness Ra, and the like.

In addition to the above components, any necessary component, for example, a silicone-based or fluorine-based slip agent or an initiator, and the like may also be added to the anti-glare layer.

The anti-glare film may comprise a base film and the anti-glare layer formed on one side of the base film. At this time, as the base film, a base film having appropriate transmittance, for example, transmittance of 80% or more for light having a wavelength of about 370 nm may be applied. That is, in most cases, a typical anti-glare film is provided with an ultraviolet screening function, thereby exhibiting low transmittance (50% or less) for a wavelength of 370 nm, because it exists at the outermost part of an optical film, but in the present application, the anti-glare film is applied by a mold, and it is necessary to apply a film having high transmittance to ultraviolet rays for the ultra-violet curing process. Therefore, the transmittance as above can be applied. The type of the base film is not particularly limited as long as it has the transmittance, and for example, among known polymer films, a polymer film exhibiting the transmittance may be selected.

In a state where the anti-glare surface of the anti-glare film is in contact with the energy beam-curable composition layer, the step of irradiating it with energy beams may be performed.

The energy beam-curable composition layer in contact with the anti-glare film may be formed by casting or coating the energy beam-curable composition. In this case, the method of casting or coating is not particularly limited, and a known manner, for example, a method such as gravure coating, roll coating, reverse coating, knife coating, die coating, lip coating, doctor coating, extrusion coating, slide coating, wire bar coating, curtain coating or spinner coating may be applied. In order to prevent occurrence of gel-shaped attachments or foreign matters during the casting process, the casting is performed under conditions without irradiation with energy beams, and if necessary, the temperature of the casting may also be appropriately controlled.

The thickness of the energy beam-curable composition layer formed by a casting method or the like, may be adjusted to an appropriate thickness in consideration of the type of the composition, the type of functional groups of the resin contained in the composition, the intended use, casting uniformity, and the formation of a flat layer to be described below. The thickness of the formed layer may be in a range of approximately 1 µm to 1000 µm. In another example, the thickness may be 5 µm or more, 10 µm or more, 15 µm or more, 20 µm or more, 25 µm or more, 30 µm or more, 35 µm or more, or may also be 900 µm or less, 800 µm or less, 700 µm or less, 600 µm or less, 500 µm or less, 400 µm or less, 300 µm or less, 200 µm or less, 100 µm or less, 90 µm or less, 85 µm or less, 80 µm or less, 75 µm or less, 70 µm or less, 65 µm or less, 60 µm or less, 55 µm or less, 50 µm or less, 45 µm or less, 40 µm or less, 35 µm or less, 30 µm or less, or 25 µm or less or so, but is not limited thereto. For example, when the energy beam-curable composition layer is formed on a base layer that a flat layer to be described below is not formed on one surface, the thickness of the formed layer may be further controlled in consideration of the contraction force of the energy beam-curable composition layer or the like. When the energy beam-curable composition layer is formed on one side of the base layer on which the flat layer is not formed, the thickness of the curable composition layer may be, for example, 35 µm or less. In another example, the thickness of the curable composition layer may be 33 µm or less, 31 µm or less, 29 µm or less, 27 µm or less, 25 µm or less, 23 µm or less, or 21 µm or less, or may be 5 µm or more, 10 µm or more, or 15 µm or more. The thickness of the curable composition layer may be controlled in consideration of not only whether a flat layer is formed on the base layer as described above, but also the type of resin included in the curable composition layer, which is described below, or the like, and thus the thickness is not limited thereto.

The irradiation of the energy beams to the energy beam-curable composition may be performed on a laminate produced by a method comprising steps of: casting an energy beam-curable composition on a base film to form an energy beam-curable composition layer; and laminating the anti-glare film on the energy beam-curable composition layer to contact the anti-glare film and the energy beam-curable composition layer. At this time, as described above, the surface of the anti-glare film in contact with the energy beam-curable composition layer may be the aforementioned anti-glare surface.

By applying the above method, it is possible to more stably maintain physical properties or quality uniformity of the prepared cured layer.

The type of the base film is not particularly limited, and a base film having appropriate surface smoothness may be applied. For example, as a base film, a film, such as a polyester film, a polyolefin film such as polypropylene or polyethylene or a norbornene resin film, an acetate film, an acrylic film, a vinyl fluoride film, a polycarbonate film, a polyamide film, a polyarylate film, cellophane or a polyethersulfone film, may be used alone or in combination of two or more. Among these films, an appropriate film may be selected in consideration of required heat resistance and transparency.

As the base film, a transparent film, for example, a film having light transmittance of 80% or more or 85% or more may be used. The thickness of the base film is not particularly limited, but in consideration of resistance to tension applied in the production process of the film, warpage or distortion of the laminate, or transmission efficiency of energy beams, and the like, it may be selected in the range of approximately 10 µm to 400 µm or 50 µm to 300 µm.

As the base film, a film having a planarization layer formed on one side may be used. For example, in the base film having a planarization layer formed on one side, the energy beam-curable composition layer may be formed on the side without the planarization layer. By applying the base film in which the planarization layer is formed on one side, it is possible to produce a film having superior surface characteristics without occurrence of curls, while the energy beam-curable composition layer is also formed with a resin and/or thickness, and the like, which are described below.

There is no particular limitation on the material for forming the planarization layer. In one example, the planarization layer may be formed by coating and curing the energy beam-curable composition applied to the formation of the film on the base film in the same manner.

After an energy beam-curable composition is cast on a base film and the anti-glare surface of the anti-glare film is laminated on the cast energy beam-curable composition to prepare a laminate, the irradiation of energy beams may be performed.

If necessary, the contact between the energy beam-curable composition layer and the anti-glare surface may also be performed by pressing them with a constant pressure.

The cured material layer may be produced by irradiating the anti-glare film with energy beams in a state where it is in contact with the energy beam-curable composition layer to cure the composition in the above manner. At this time, the irradiation direction of the energy beams is not limited, and for example, the energy beams may be irradiated on the anti-glare film side, or on the side of the energy beam-curable composition layer that is not in contact with the anti-glare film or both sides. Even when energy beams are irradiated on the laminate (anti-glare film/energy beam-curable composition layer/base film), the energy beams may be irradiated from the anti-glare film side, the base film side, or both sides.

In one example, when the irradiation of energy beams is performed on the laminate, the energy beams may be irradiated to the energy beam-curable composition layer through the base film.

For example, when ultraviolet rays are irradiated as the energy beams, the ultraviolet rays generated using an ultraviolet lamp may be irradiated. As the ultraviolet lamp, a metal halide lamp, a high-pressure mercury lamp, a low-pressure mercury lamp, a pulse type xenon lamp, a xenon/mercury mixture lamp, a low-pressure sterilization lamp and/or an electrodeless lamp, and the like may be applied. The irradiation conditions may be determined depending on the composition of the energy beam-curable composition, and the like, and usually, the irradiation may be performed to have an exposure amount in a level of approximately 0.01 to 10 mJ/cm$^2$ or so. In another example, the amount of the exposed energy may be about 0.05 mJ/cm$^2$ or more, 0.1 mJ/cm$^2$ or more, 0.5 mJ/cm$^2$ or more, 1 mJ/cm$^2$ or more, or 1.5 mJ/cm$^2$ or more, or may also be 9 mJ/cm$^2$ or less, 8 mJ/cm$^2$ or less, 7 mJ/cm$^2$ or less, 6 mJ/cm$^2$ or less, or 5 mJ/cm$^2$ or less or so.

The temperature at which the irradiation of such energy beams is performed is not particularly limited. Usually, the irradiation of the energy beams is performed at room temperature (within the range of 15° C. to 35° C.), but if necessary, the relevant temperature can be adjusted, and in this case, a heating/cooling device or the like may also be applied during the energy beam irradiation process.

Although there is no particular limitation on the type of the energy beam-curable composition applied in the present application, one having castable flowability or plasticity while having energy-beam curability may be applied in consideration of the casting, coating efficiency, desired surface characteristics and/or curing shrinkage before and after curing, and the like. If necessary, the curing shrinkage rate may also be controlled within an appropriate range in order to prevent warpage or distortion, and the like due to curing shrinkage before and after curing. Typically, an energy beam-curable composition having a volume shrinkage rate before and after curing in a range of 3% to 10% may be used.

For example, as the energy beam-curable composition, an appropriate type of a so-called acrylic energy beam-curable composition, silicone-based energy beam-curable composition or epoxy-based energy beam-curable composition may be selected and used. In addition, a solvent-free composition may be applied in consideration of process efficiency or film properties.

As the energy beam-curable composition, for example, a composition comprising at least a silicone resin component and a reactive diluent may be used.

The type of the applied silicone resin component is not particularly limited, but in order to more effectively satisfy the desired physical properties, a silicone resin component represented by the following average unit formula 1 may be applied.

$$(R^1{}_3SiO_{1/2})_a(R^2{}_2SiO_{2/2})_b(R^3SiO_{3/2})_c$$
$$(SiO_{4/2})_d(RO_{1/2})_e \qquad \text{[Average Unit Formula 1]}$$

In Average Unit Formula 1, $R^1$ to $R^3$ are each independently a hydrogen atom, an alkyl group, an aryl group or an energy beam-curable group, and when $R^1$ to $R^3$ exist plurally, they are each the same or different from each other, and at least one of $R^1$ to $R^3$ is an energy beam-curable group, and when a+b+c+d has been converted to 1, a, b, c and d satisfy $0 \leq a \leq 1$, $0 < b \leq 1$, $0 < c \leq 1$ and $0 \leq d \leq 1$, respectively, and e is a number in which e/(a+b+c+d) falls within a range of 0 to 0.4. The energy beam-curable group may be, for example, a radical curable group or a cationic curable group, which may be preferably a radical curable group in consideration of implementation of the desired physical properties or the like.

The average unit represents an average ratio of monomer units contained in the silicone resin component, that is, so-called M, D, T and Q units, where the matter that the silicone resin component represents Average Unit Formula 1 above may mean a case that the component comprises one polymer component (silicone resin) containing the monomer units in the ratio according to Average Unit Formula 1 above or a case that the component comprises two or more polymer components (silicone resin) and the average of all monomer units included in the two or more components is defined by Average Unit Formula 1 above.

When a+b+c+d has been converted to 1 in Average Unit Formula 1 above, the a and d may also each independently be 0.95 or less, 0.9 or less, 0.85 or less, 0.8 or less, 0.75 or less, 0.7 or less, 0.65 or less, 0.6 or less, 0.55 or less, 0.5 or less, 0.45 or less, 0.4 or less, 0.35 or less, 0.3 or less, 0.25 or less, 0.2 or less, 0.15 or less, 0.1 or less, or 0.05 or less or so.

When a+b+c+d has been converted to 1 in Average Unit Formula 1 above, the b in another example may also be 0.01 or more, 0.02 or more, 0.03 or more, 0.04 or more, 0.05 or more, 0.06 or more, 0.07 or more, 0.08 or more, 0.09 or more, 0.1 or more, 0.15 or more, 0.2 or more, 0.25 or more, or may also be 0.95 or less, 0.9 or less, 0.85 or less, 0.8 or less, 0.75 or less, 0.7 or less, 0.65 or less, 0.6 or less, 0.55 or less, 0.5 or less, 0.45 or less, 0.4 or less, 0.35 or less, 0.3 or less, or 0.25 or less or so.

When a+b+c+d has been converted to 1 in Average Unit Formula 1 above, the c may be 0.1 or more, 0.15 or more, 0.2 or more, 0.25 or more, 0.3 or more, 0.35 or more, 0.4 or more, 0.45 or more, 0.5 or more, 0.55 or more, 0.6 or more, 0.65 or more, 0.7 or more, or 0.75 or more, or may also be 0.95 or less, 0.9 or less, 0.85 or less, 0.8 or less, or 0.75 or less or so.

In Average Unit Formula 1, $RO_{1/2}$ may mean a condensable functional group bonded to the silicon atom. That is, in one example, the silicone resin component may be prepared by condensing a condensable silane compound, where the remaining condensable functional group without any reaction in the process may be represented by the $RO_{1/2}$.

In Average Unit Formula 1, e may be a number such that e/(a+b+c+d) is in the range of 0 to 0.4. In another example, the e/(a+b+c+d) may also be 0.35 or less or so, 0.3 or less or so, 0.25 or less or so, 0.2 or less or so, 0.15 or less or so, 0.1 or less or so, or 0.05 or less or so.

In Average Unit Formula 1, $R^1$ to $R^3$ are each a functional group directly bonded to the silicon atom, which may each exist plurally in the silicone resin component represented by Average Unit Formula 1, and when they exist plurally, may be the same or different. The $R^1$ to $R^3$ may each independently be a hydrogen atom, an alkyl group, an aryl group or an energy beam-curable functional group. At least one of $R^1$ to $R^3$ is an energy beam-curable functional group, and for example, at least the $R^3$ (at least one of $R^3$ in the case of a plurality of $R^3$) may be an energy beam-curable functional group.

In Average Unit Formula above, $R^2$ may suitably be an alkyl group.

Here, the energy beam-curable functional group may be, for example, a so-called radical curable functional group or a cationic curable functional group. Typically, the radical curable functional group includes an alkenyl group, a (meth)acryloyl group, a (meth)acryloyloxy group, a (meth)acryloylalkyl group or a (meth)acryloyloxyalkyl group, and the like, and the cationic curable functional group can be exemplified by an epoxy group. The term epoxy group may mean a monovalent residue derived from cyclic ether having three ring constituent atoms or a compound containing the cyclic ether. The epoxy group can be exemplified by a glycidyl group, an epoxyalkyl group, a glycidoxyalkyl group or an alicyclic epoxy group, and the like. Here, the alicyclic epoxy group may mean a monovalent residue derived from a compound including an aliphatic hydrocarbon ring structure and a structure in which two carbon atoms forming the aliphatic hydrocarbon ring also form an epoxy group. As the alicyclic epoxy group, an alicyclic epoxy group having 6 to 12 carbon atoms may be exemplified, and for example, a 3,4-epoxycyclohexylethyl group and the like may be exemplified.

The energy beam-curable functional group may preferably be a radical curable functional group. In the case of a resin containing a cationic curable functional group, it is polymerized through a ring-opening reaction, so that there is almost no volume reduction due to curing or the like, whereas in the case of a resin containing the radical curable functional group, it may have a high atomic density while shrinking by curing or the like, thereby being more suitable for realization of the desired physical properties.

In the total $R^1$ to $R^3$, such energy beam-curable functional groups may be present in a ratio of approximately 50 mol % or more, approximately 55 mol % or more, approximately 60 mol % or more, approximately 65 mol % or more, approximately 70 mol % or more, approximately 75 mol % or more, approximately 80 mol % or more, approximately 85 mol % or more, approximately 90 mol % or more, or approximately 95 mol % or more. There is no particular limitation on the upper limit of the ratio of the energy beam-curable functional group, and for example, the ratio of the functional group may be approximately 100 mol % or less, approximately 95 mol % or less, approximately 90 mol % or less, approximately 85 mol % or less, approximately 80 mol % or less, approximately 75 mol % or less, or approximately 70 mol % or less or so.

The silicone resin component may have a weight average molecular weight (Mw) in a range of 10,000 to 50,000. The weight average molecular weight may be a conversion value of standard polystyrene measured by so-called GPC (gel permeation chromatography). In another example, the weight average molecular weight may be about 11000 g/mol or more, 12000 g/mol or more, 13000 g/mol or more, 14000 g/mol or more, 15000 g/mol or more, 16000 g/mol or more, 17000 g/mol or more, 18000 g/mol or more, 19000 g/mol or more, 20000 g/mol or more, 21000 g/mol or more, 22000 g/mol or more, 23000 g/mol or more, 24000 g/mol or more, 25000 g/mol or more, 26000 g/mol or more, 27000 g/mol or more, 28000 g/mol or more, 29000 g/mol or more, or 30000 g/mol or more, or may also be 45000 g/mol or less, 40000 g/mol or less, 35000 g/mol or less, 30000 g/mol or less, 25000 g/mol or less, or 20000 g/mol or less or so.

The silicone resin component may also have a molecular weight distribution (PDI, Mw/Mn), that is, a ratio of the weight average molecular weight (Mw) to the number average molecular weight (Mn) of 1.8 or more or so. In another example, the molecular weight distribution may be 1.9 or more, 2.0 or more, 2.1 or more, 2.2 or more, or 2.3 or more, or may be 3.0 or less, 2.9 or less, 2.8 or less, 2.7 or less, 2.6 or less, 2.5 or less, or 2.4 or less.

The silicone resin component having the above-described average unit and having the above molecular weight characteristics allows for effective formation of a cured material layer having desired physical properties.

For production of the silicone resin component, a polymerization process for condensing a so-called condensable silane compound (e.g., alkoxysilane compound) and a molecular weight control process following the polymerization process are required. Here, various methods of preparing a silicone resin component by condensing a condensable silane compound are known, and generally, only such a condensation process is performed to prepare a silicone resin component. However, it is difficult to secure molecular weight characteristics of the above-mentioned level simply only by polymerization by the condensation process as above. Therefore, an appropriate molecular weight control process is required following the condensation process.

The molecular weight control process may be performed, for example, while maintaining the polymerization reaction product under decompression conditions at a predetermined temperature. In this process, while the solvent, low molecular weight components and/or unreacted substances contained in the polymerization reaction product are removed, the molecular weight can be adjusted to a desired level. Here, the decompression conditions are not particularly limited, but the decompression process may be performed at a vacuum degree of about 50 to 90 Torr. In another example, the vacuum degree may be about 55 Torr or more, about 60 Torr or more, or about 65 Torr or more, or may be about 85 Torr or less, about 80 Torr or less, or about 75 Torr or less or so.

The decompression process may be performed under a predetermined temperature profile. For example, the decompression process may comprise a first step of maintaining the vacuum degree at the level at a temperature in the range of about 30° C. to 70° C., and a second step of maintaining the temperature in the range of 60 to 100° C. following the first step, while maintaining the vacuum degree at the level. In the first step, if the above-mentioned vacuum degree is maintained while maintaining the temperature in the range of about 30° C. to 70° C., the temperature is lowered by the decompression, and usually, the temperature drops to a level of 10° C. to 30° C. or so. Therefore, when the temperature drops as above, the temperature is raised to the level of the second step again, and the molecular weight control process is further performed. In another example, the temperature of the first step may be about 35° C. or more, 40° C. or more, or 45° C. or more, or may be 65° C. or less, 60° C. or less, or 55° C. or less, and in another example, the temperature of the second step may be about 65° C. or more, 70° C. or more, or 75° C. or more, or may be about 95° C. or less, about 90° C. or less, or 85° C. or less. Also, in the first step, as mentioned above, a process in which the temperature is lowered from a temperature in the range of about 30° C. to 70° C. to a level of about 10° C. to 30° C. at the above-mentioned vacuum degree may be performed substantially. The time during which the first and second steps are performed is not particularly limited, but in order to secure an appropriate level of molecular weight, the first step may be performed for approximately 1 hour to 5 hours, and the second step may be performed for approximately 10 minutes to 60 minutes or so.

The method of obtaining the polymerization reaction product applied to the molecular weight control process is not particularly limited. In the industry, various contents of preparing a silicone resin using a condensable compound such as alkoxy silane are known, and all of these methods can be applied in the present application.

In order to advantageously secure the desired appropriate molecular weight in the subsequent molecular weight control process, as the polymerization process, a method of polymerizing a condensable silane as alkoxy silane in an aqueous solvent and a mixed solvent of alcohol, ketone and/or acetate by applying a base catalyst may be applied.

In the above process, a known compound may be applied as the alkoxy silane.

Here, the applicable aqueous solvent includes, for example, water, where such an aqueous solvent can be applied in a ratio of approximately 0.1 to 10 moles per mole of the total condensable silane compound (e.g., alkoxy silane) applied to the polymerization. In another example, the ratio of the aqueous solvent may be about 0.5 moles or more, about 1 mole or more, about 1.5 moles or more, about 2 moles or more, or about 2.5 moles or more, or may also be about 9 moles or less, about 8 moles or less, about 7 moles or less, about 6 moles or less, about 5 moles or less, about 4 moles or less, or about 3 moles or less or so.

Here, the applicable alcohol may be exemplified by ethyl alcohol, n-propyl alcohol, i-propyl alcohol, i-butyl alcohol, n-butyl alcohol and/or t-butyl alcohol, and the like, the ketone solvent may be exemplified by acetone, methyl ethyl ketone, methyl isobutyl ketone, dimethyl ketone, methyl isopropyl ketone and/or acetyl acetone, and the like, and the acetate solvent may be exemplified by methyl acetate, ethyl acetate, propyl acetate and/or butyl acetate, and the like, without being limited thereto. Such an alcohol, ketone or acetate solvent may be applied in a ratio of approximately 0.1 to 10 moles per mole of the total condensable silane compound (e.g., alkoxy silane) applied to the polymerization. In another example, the ratio of the alcohol, ketone or acetate solvent may be about 0.5 moles or more, about 1 mole or more, about 1.5 moles or more, about 2 moles or more, or about 2.5 moles or more, or may also be about 9 moles or less, about 8 moles or less, about 7 moles or less, about 6 moles or less, about 5 moles or less, about 4 moles or less, or about 3 moles or less or so.

As the base catalyst applied in the above process, for example, an amine compound having a pKa of 15 or less, or the like may be applied. In another example, the pKa of the amine compound may be about 14.5 or less, about 14 or less, about 13.5 or less, about 13 or less, about 12.5 or less, about 12 or less, about 11.5 or less, about 11 or less, or about 10.5 or less, or may be about 1 or more, about 2 or more, about 3 or more, about 4 or more, about 5 or more, about 6 or more, about 7 or more, about 8 or more, about 9 or more, or about 10 or more, but is not limited thereto. As the amine compound, for example, trialkyl amine such as triethylamine may be applied, but there is no particular limitation as long as the pKa is within the above range.

The amine compound may be applied in a ratio of about 0.0001 moles to 0.1 moles per mole of the total condensable silane compound (e.g., alkoxy silane). In another example, the ratio may be about 0.0005 moles or more, about 0.0007 moles or more, about 0.0009 moles or more, or about 0.01 moles or more, or may also be about 0.09 moles or less, about 0.08 moles or less, about 0.07 moles or less, about 0.06 moles or less, about 0.05 moles or less, about 0.04 moles or less, about 0.03 moles or less, or about 0.02 moles or less or so.

For example, a polymerization reaction product may be obtained by maintaining the mixture of such components at a temperature in the range of approximately 50 to 110° C. for about 8 to 16 hours or so. In another example, the temperature of the polymerization reaction may be about 55° C. or more, about 60° C. or more, about 65° C. or more, about 70° C. or more, or about 75° C. or more, or may be about 105° C. or more, about 100° C. or more, about 95° C. or more, about 90° C. or more, or about 85° C. or more or so, and in another example, the polymerization time may be about 9 hours or more, about 10 hours or more, or about 11 hours or more, or may also be about 15 hours or less, about 14 hours or less, or about 13 hours or less or so.

In the case of introducing the polymer product polymerized in the above manner into the molecular weight control process, the desired molecular weight properties can be more effectively secured.

The energy beam-curable composition may comprise a reactive diluent together with the components. The reactive diluent can make the casing process perform properly by adjusting the viscosity of the composition and the like to an appropriate range.

As the reactive diluent, a known component may be used without particular limitation. A suitable reactive diluent is known depending on the curing type (for example, radical curing type or cationic curing type, etc.) of the energy beam-curable composition.

In one example, when the silicone resin component comprises a radical curable functional group (for example, an alkenyl group, a (meth)acryloyl group, a (meth)acryloyloxy group, a (meth)acryloylalkyl group, a (meth)acryloyloxyalkyl group, etc.) as the energy beam-curable functional group, various acrylate compounds may be applied as the reactive diluent.

As such an acrylate compound, a polyfunctional acrylate compound, such as an alkyl (meth) acrylate such as methyl (meth)acrylate, ethyl (meth)acrylate, n-propyl (meth)acrylate, isopropyl (meth)acrylate, n-butyl (meth)acrylate, t-butyl (meth)acrylate, sec-butyl (meth)acrylate, pentyl (meth)acrylate, 2-ethylhexyl (meth)acrylate, 2-ethylbutyl (meth)acrylate, n-octyl (meth)acrylate, isooctyl (meth)acrylate, isononyl (meth)acrylate, lauryl (meth)acrylate or tetradecyl (meth)acrylate, a hydroxyalkyl (meth)acrylate such as 2-hydroxyethyl (meth)acrylate, 2-hydroxypropyl (meth)acrylate, 4-hydroxybutyl (meth)acrylate, 6-hydroxyhexyl (meth)acrylate or 8-hydroxyoctyl (meth)acrylate, a bifunctional acrylate such as 1,4-butanediol di(meth)acrylate, 1,6-hexanediol di(meth)acrylate, neopentyl glycol di(meth)acrylate, polyethylene glycol di(meth)acrylate, neopentylglycol adipate di(meth)acrylate, hydroxyl pivalic acid neopentylglycol di(meth)acrylate, dicyclopentanyl di(meth)acrylate, caprolactone modified dicyclopentenyl di(meth)acrylate, ethylene oxide modified di(meth)acrylate, di(meth) acryloxy ethyl isocyanurate, allylated cyclohexyl di(meth) acrylate, tricyclodecane dimethanol (meth)acrylate, dimethylol dicyclopentane di(meth)acrylate, ethylene oxide modified hexahydrophthalic acid di(meth)acrylate, tricyclodecane dimethanol (meth)acrylate, neopentylglycol modified trimethylpropane di(meth)acrylate, adamantane di(meth)acrylate or 9,9-bis[4-(2-acryloyloxyethoxy)phenyl] fluorene; a trifunctional acrylate such as trimethylolpropane tri(meth)acrylate, dipentaerythritol tri(meth)acrylate, propionic acid modified dipentaerythritol tri(meth)acrylate, pentaerythritol tri(meth)acrylate, propylene oxide modified trimethylolpropane tri(meth)acrylate, trifunctional urethane (meth)acrylate or tris(meth)acryloxyethyl isocyanurate; a tetrafunctional acrylate such as diglycerin tetra(meth)acrylate or pentaerythritol tetra(meth)acrylate; a pentafunctional acrylate such as propionic acid modified dipentaerythritol penta(meth)acrylate; and a hexafunctional acrylate such as dipentaerythritol hexa(meth)acrylate, caprolactone modified dipentaerythritol hexa(meth)acrylate or urethane (meth) acrylate (e.g., reactant of isocyanate monomer and trimethylolpropane tri(meth)acrylate) may be used, and among them, one or two or more may be selected and used in consideration of the desired viscosity and physical properties, and the like.

In another example, when the silicone resin component comprises a cationic curable functional group (for example, an epoxy group, etc.) as the energy beam-curable functional group, an epoxy compound or an oxetane compound may be applied as the reactive diluent.

Various epoxy or oxetane compounds that can be applied as the reactive diluent in the cationic curable composition are known in the art, and such known reactive diluents may be used without limitation.

For example, the epoxy compound or oxetane compound that can be applied as the reactive diluent can be exemplified by bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, an epoxy novolac resin, hydrogenated bisphenol A diglycidyl ether, hydrogenated bisphenol F diglycidyl ether, hydrogenated bisphenol S diglycidyl ether, 3,4-epoxycyclohexylmethyl-3',4'-epoxycyclohexanecarboxylate, 2-(3,4-epoxycyclohexyl-5,5-spiro-3,4-epoxy)-cyclohexane-1,4-dioxane, bis(3,4-epoxycyclohexylmethyl) adipate, vinyl cyclohexene oxide, 4-vinyl epoxycyclohexane, vinylcyclohexene dioxide, limonene oxide, limonene dioxide, bis(3,4-epoxy-6-methylcyclohexylmethyl) adipate, 3,4-epoxy-6-methylcyclohexyl-3',4'-epoxy-6'-methylcyclohexanecarboxylate, ε caprolactone-modified 3,4-epoxycyclohexylmethyl-3',4'- epoxycyclohexanecarboxylate, trimethylcaprolactone-modified 3,4-epoxycyclohexylmethyl-3',4'-epoxycyclohexanecarboxylate, β methyl-δ valero lactone-modified 3,4-epoxycyclohexylmethyl-3',4'-epoxycyclohexanecarboxylate, methylenebis(3,4-epoxycyclohexane), bicyclohexyl-3,3'-epoxide, bis(3,4-epoxycyclohexyl) having —O—, —S—, —SO—, —SO$_2$—, —C(CH$_3$)$_2$—, —CBr$_2$—, —C(CBr$_3$)$_2$—, —C(CF$_3$)$_2$—, —C(CCl$_3$)$_2$— or —CH(C$_6$H$_5$)— bond, dicyclopentadiene diepoxide, di(3,4-epoxycyclohexylmethyl) ether of ethylene glycol, ethylenebis(3,4-epoxycyclohexanecarboxylate), epoxyhexahydrodioctyl phthalate, epoxyhexahydro-di-2-ethylhexyl phthalate, 1,4-butanediol diglycidyl ether, 1,6-hexanediol diglycidyl ether, neopentylglycol diglycidyl ether, glycerol triglycidyl ether, trimethylolpropane triglycidyl ether, polyethylene glycol diglycidyl ether, polypropylene glycol diglycidyl ether, diglycidyl ester of aliphatic long chain dibasic acid, monoglycidyl ether of aliphatic higher alcohol, monoglycidyl ether of polyether alcohol obtained by adding alkylene oxide to phenol, cresol, butyl phenol or these compounds, glycidyl ester of higher fatty acid, epoxidized soybean oil, epoxy butyl stearic acid, epoxy octyl stearic acid, epoxidized linseed oil, epoxidized polybutadiene, 1,4-bis[(3-ethyl-3-oxetanylmethoxy)methyl] benzene, 3-ethyl-3-hydroxymethyloxetane, 3-ethyl-3-(3-hydroxypropyl)oxymethyloxetane, 3-ethyl-3-(4-hydroxybutyl) oxymethyloxetane, 3-ethyl-3-(5-hydroxypentyl) oxymethyloxetane, 3-ethyl-3-phenoxymethyloxetane, bis ((1-ethyl(3-oxetanyl)methyl)ether, 3-ethyl-3-((2-ethylhexyloxy)methyl)oxetane, 3-ethyl-((triethoxysilylpropoxymethyl)oxetane, 3-(meth) allyloxymethyl-3-ethyloxetane, 3-hydroxymethyl-3-ethyloxetane, (3-ethyl-3-oxetanylmethoxy)methylbenzene, 4-fluoro-[1-(3-ethyl-3-oxetanylmethoxy)methyl]benzene, 4-methoxy-[1-(3-ethyl-3-oxetanylmethoxy)methyl]-benzene, [1-(3-ethyl-3-oxetanylmethoxy)ethyl]phenyl ether, isobutoxymethyl (3-ethyl-3-oxetanylmethyl) ether, 2-ethylhexyl (3-ethyl-3-oxetanylmethyl) ether, ethyldiethylene glycol (3-ethyl-3-oxetanylmethyl) ether, dicyclopentadiene (3-ethyl-3-oxetanylmethyl) ether, dicyclopentenyloxyethyl (3-ethyl-3-oxetanylmethyl) ether, dicyclopentenyl (3-ethyl-3-oxetanylmethyl) ether, tetrahydrofurfuryl (3-ethyl-3-oxetanylmethyl) ether, 2-hydroxyethyl (3-ethyl-3-oxetanylmethyl) ether or 2-hydroxypropyl (3-ethyl-3-oxetanylmethyl) ether or the like, or a combination of two or more selected from the foregoing, and the like, but is not limited thereto.

The ratio of the reactive diluent applied in the energy beam-curable composition is adjusted in consideration of the desired viscosity or the like, and there is no particular limitation, but the reactive diluent may usually be applied in a ratio of 1 to 200 parts by weight relative to 100 parts by weight of the silicone resin component. In another example, the ratio may be 3 parts by weight or more, 5 parts by weight or more, 7 parts by weight or more, or 9 parts by weight or more, or may also be 190 parts by weight or less, 180 parts by weight or less, 170 parts by weight or less, 160 parts by weight or less, 150 parts by weight or less, 140 parts by weight or less, 130 parts by weight or less, 120 parts by weight or less, 110 parts by weight or less, 100 parts by weight or less, 90 parts by weight or less, 80 parts by weight or less, 70 parts by weight or less, 60 parts by weight or less, 50 parts by weight or less, 40 parts by weight or less, 30 parts by weight or less, or 20 parts by weight or less or so.

The energy beam-curable composition may comprise the silicone resin component and the reactive diluent as basic components, and may also comprise necessary additional components. Such an additive component can be exemplified by an initiator capable of initiating curing of the energy beam-curable composition, a dispersant, a surfactant, an antistatic agent, a silane coupling agent, a thickener, an anti-coloring agent, a colorant (pigment, dye), an antifoaming agent, a leveling agent, a flame retardant, an ultraviolet absorber, an adhesion imparting agent, a polymerization inhibitor, an antioxidant and/or a surface modifier, and the like, but is not limited thereto.

As an additional component that may be included in the energy beam-curable composition, scattering particles for haze control are also included. These particles usually have a particle diameter capable of scattering light, where particles having a refractive index different from that of the surrounding matrix may be applied additionally and particles having an appropriate level of particle diameter and refractive index may be used in consideration of the desired haze.

By applying such an energy beam-curable composition to the above-described method to prepare a cured material layer, it is possible to produce a cured material layer having the desired physical properties.

The film of the present application may comprise a base film in which the cured material layer is formed on one side. This base film may be a base film applied in the above-described production method.

As described above, a known film may be applied without particular limitation as the base film, but in order to more effectively satisfy the desired physical properties, a polymer film having mechanical and/or thermal anisotropy may be applied. In this specification, the polymer film which is anisotropic in mechanical and/or thermal aspects may be referred to as an asymmetric polymer film. Here, the matter that the polymer film is anisotropic in terms of mechanical properties is a case where it has elongation, stress and elastic modulus characteristics as described below, and the matter that it is thermally anisotropic is a case where it has a thermal expansion coefficient or the like as described below.

Measurement of the physical properties of each polymer film mentioned in this specification is measured according to the methods described in the example section of this specification.

As such a polymer film, a film known as a so-called high stretch PET (poly(ethylene terephthalate)) film or SRF (super retardation film) is typically known. Therefore, in the present application, the polymer film may be, for example, a polyester film.

Such films are known in the art, where these films exhibit asymmetry in mechanical and/or thermal properties due to a high stretching process in the production processes. A typical example of the polymer film known in the industry is a polyester film such as a PET (poly(ethylene terephthalate)) film, and for example, there is a film of the trade name SRF (super retardation film) series supplied by Toyobo.

In one example, the polymer film may have a ratio (E1/E2) of a film (including a cured layer/a base film or including a cured material layer/a base film/a planarization layer) (E1) in any in-plane first direction to a film (including a cured material layer/a base film or including a cured material layer/a base film/a planarization layer) (E2) in a second direction perpendicular to the first direction of 3 or more. In another example, the ratio (E1/E2) may be about 3.5 or more, 4 or more, 4.5 or more, 5 or more, 5.5 or more, 6 or more, or 6.5 or more. In another example, the ratio (E1/E2) may be about 20 or less, 18 or less, 16 or less, 14 or less, 12 or less, 10 or less, 8 or less, or 7.5 or less.

In this specification, the terms first direction and second direction of the polymer film are arbitrary directions in the plane of the film substrate. For example, when the polymer film is a stretched polymer film, the in-plane direction may be an in-plane direction formed by MD (machine direction) and TD (transverse direction) directions of the polymer film. In one example, the first direction described in this specification may be any one direction of slow axis and fast axis directions of the polymer film, and the second direction may be the other direction of the slow axis and fast axis directions. In another example, when the polymer film is a stretched polymer film, the first direction may be any one direction of MD (machine direction) and TD (transverse direction) directions, and the second direction may be the other direction of MD (machine direction) and TD (transverse direction) directions.

The polymer film may have an elongation rate in the first direction (for example, the above-described slow axis direction or TD direction) of 15% or more, 20% or more, 25% or more, 30% or more, 35% or more, or 40% or more. In another example, the elongation rate may be about 60% or less, 55% or less, 50% or less, or 45% or less.

The polymer film may have a ratio (CTE2/CTE1) of a coefficient of thermal expansion (CTE2) in the second direction to a coefficient of thermal expansion (CTE1) in the first direction of 1.5 or more. The coefficients of thermal expansion (CTE1, CTE2) are each a value identified in a temperature range of 40° C. to 80° C. In another example, the ratio (CTE2/CTE1) may be about 2 or more, or may be 10 or less, 9 or less, 8 or less, 7 or less, 6 or less, 5 or less, 4 or less, or 3 or less or so.

The coefficient of thermal expansion (CTE2) in the second direction may be in a range of 5 to 150 ppm/K. The coefficient of thermal expansion may be about 10 ppm/K or more, 15 ppm/K or more, 20 ppm/K or more, 25 ppm/K or more, 30 ppm/K or more, 35 ppm/K or more, 40 ppm/K or more, 45 ppm/K or more, 50 ppm/K or more, about 55 ppm/K or more, 60 ppm/K or more, or 65 ppm/K or more, or may be 140 ppm/K or less, 130 ppm/K or less, 120 ppm/K or less, 100 ppm/K or less, 95 ppm/K or less, 90 ppm/K or less, 85 ppm/K or less, 80 ppm/K or less, 75 ppm/K or less, or 70 ppm/K or less.

The polymer film may have a ratio (YM1/YM2) of an elastic modulus (YM1) in the first direction to an elastic modulus (YM2) in the second direction of 1.5 or more. In another example, the ratio (YM1/YM2) may be about 2 or more, or may be 10 or less, 9 or less, 8 or less, 7 or less, 6 or less, 5 or less, 4 or less, 3 or less, or 2.5 or less.

The elastic modulus (YM1) in the first direction may be in a range of about 2 to 10 GPa. In another example, the elastic modulus (YM1) may be about 2.5 GPa or more, 3 GPa or more, 3.5 GPa or more, 4 GPa or more, 4.5 GPa or more, 5 GPa or more, or 5.5 GPa or more, or may also be about 9.5 GPa or less, 9 GPa or less, 8.5 GPa or less, 8 GPa or less, 7.5 GPa or less, 7 GPa or less, 6.5 GPa or less, or 6 GPa or less.

Unless otherwise specified, the elastic modulus referred to in this specification is a so-called Young's modulus, which is measured according to the method of Examples as described below.

The polymer film may have a ratio (MS1/MS2) of a maximum stress (MS1) in the first direction to a maximum stress (MS2) in the second direction of 1.5 or more. In another example, the ratio (MS1/MS2) may be about 2 or more, or may be 10 or less, 9 or less, 8 or less, 7 or less, 6 or less, 5 or less, 4 or less, 3 or less, or 2.5 or less.

The maximum stress (MS1) in the first direction (for example, the above-described slow axis direction or TD direction) may be in a range of about 80 to 300 MPa. In another example, the maximum stress (MS1) may be about 90 MPa or more, about 100 MPa or more, about 110 MPa or more, about 120 MPa or more, about 130 MPa or more, about 140 MPa or more, about 150 MPa or more, about 155 MPa or more, 160 MPa or more, 165 MPa or more, 170 MPa or more, 175 MPa or more, 180 MPa or more, 185 MPa or more, 190 MPa or more, or 195 MPa or more, or may also be about 300 MPa or less, about 290 MPa or less, about 280 MPa or less, about 270 MPa or less, about 260 MPa or less, about 250 MPa or less, about 245 MPa or less, 240 MPa or less, 235 MPa or less, 230 MPa or less, 225 MPa or less, 220 MPa or less, 215 MPa or less, 210 MPa or less, 205 MPa or less, or 200 MPa or less.

As described above, a representative example of such a polymer film having large optical, mechanical and/or thermal asymmetry is a stretched PET (polyethylene terephthalate) film known as a so-called high stretch polyester film or the like, where these films are easily available in the industry.

A film (including the base film+the cured material layer) in which the cured material layer is formed on one side of the polymer film (base film) or a film (including the planarization layer+the base film+the cured material layer) in which the cured material layer is formed on one side of the base film and the planarization layer is formed on the other side, may be equivalent to the polymer film (base film), or may exhibit asymmetry controlled therefrom.

For example, the film (including the cured material layer/the base film or including the cured material layer/the base film/the planarization layer) may have a ratio (EF1/EF2) of a film (including the cured material layer/the base film or including the cured material layer/the base film/the planarization layer) (EF1) in any in-plane first direction to a film (including the cured material layer/the base film or including the cured material layer/the base film/the planarization layer) (EF2) in a second direction perpendicular to the first direction of 1.5 or more. In another example, the ratio (EF1/EF2) may be about 2 or more, 2.5 or more, 3 or more, or 3.5 or more. In another example, the ratio (EF1/EF2) may be about 20 or less, 18 or less, 16 or less, 14 or less, 12 or less, 10 or less, 8 or less, 7.5 or less, 7 or less, 6.5 or less, 6 or less, 5.5 or less, 5 or less, 4.5 or less, 4 or less, 3.5 or less, or 3 or less.

The first and second directions mentioned while describing the mechanical and/or thermal characteristics of the film (including the cured material layer/the base film or including the cured material layer/the base film/the planarization layer) mentioned in this specification may be the same directions as the first and second directions described while mentioning the mechanical and/or thermal characteristics of the polymer film (base film), respectively.

Here, the elongation rate (EF1) of the film (including the cured material layer/the base film or including the cured material layer/the base film/the planarization layer) in the first direction may be 1.5% or more, 2% or more, 2.5% or more, 3% or more, 3.5% or more, 4% or more, 4.5% or more, 5% or more, 5.5% or more, or 6% or more. The elongation rate may be about 20% or less, 15% or less, 10% or less, or 5% or less.

The ratio (E1/EF1) of the elongation rate (E1) of the polymer film in the first direction to the elongation rate (EF1) of the film (including the cured material layer/the base film or including the cured material layer/the base film/the planarization layer) (EF1) in the first direction may be, for example, in a range of about 2 to 20. In another example, the ratio (E1/EF1) may be about 2.5 or more, about 3 or more, about 3.5 or more, about 4 or more, about 4.5 or more, about 5 or more, about 5.5 or more, about 6 or more, about 6.5 or more, about 7 or more, about 7.5 or more, about 8 or more, about 8.5 or more, about 9 or more, about 9.5 or more, or about 10 or more, or may also be about 19 or less, 18 or less, 17 or less, 16 or less, 15 or less, 14 or less, 13 or less, 12 or less, 11 or less, 10 or less, 9 or less, 8 or less, or 7 or less.

The film (including the cured material layer/the base film or including the cured material layer/the base film/the planarization layer) may have a ratio (CTEF2/CTEF1) of a coefficient of thermal expansion (CTEF2) in the second direction to a coefficient of thermal expansion (CTEF1) in the first direction of 1.5 or more. The coefficients of thermal expansion (CTEF1, CTEF2) are each a value identified in a temperature range of 40° C. to 80° C. In another example, the ratio (CTEF2/CTEF1) may be about 2 or more, or may be 10 or less, 9 or less, 8 or less, 7 or less, 6 or less, 5 or less, 4 or less, or 3 or less or so.

The coefficient of thermal expansion (CTEF2) in the second direction may be in the range of 5 to 150 ppm/K. The coefficient of thermal expansion may be about 10 ppm/K or more, 15 ppm/K or more, 20 ppm/K or more, 25 ppm/K or more, 30 ppm/K or more, 35 ppm/K or more, 40 ppm/K or more, 45 ppm/K or more, 50 ppm/K or more, about 55 ppm/K or more, 60 ppm/K or more, or 65 ppm/K or more, 70 ppm/K or more, 75 ppm/K or more, 80 ppm/K or more, or 85 ppm/K or more, or may be 140 ppm/K or less, 130 ppm/K or less, 120 ppm/K or less, 100 ppm/K or less, 95 ppm/K or less, or 90 ppm/K or less.

The ratio (CTE2/CTEF2) of the coefficient of thermal expansion (CTE2) of the polymer film in the second direction to the coefficient of thermal expansion (CTEF2) of the film (including the cured material layer/the base film or including the cured material layer/the base film/the planarization layer) in the second direction may be, for example, about 2 or less. In another example, the ratio (CTE2/CTEF2) may be about 0 or more, about 0.1 or more, about 0.2 or more, about 0.3 or more, about 0.4 or more, about 0.5 or more, about 0.6 or more, or about 0.7 or more, or may also be about 1.5 or less, 1 or less, 0.9 or less, 0.85 or less, or 0.8 or less.

The film (including the cured material layer/the base film or including the cured material layer/the base film/the planarization layer) may have a ratio (YMF1/YMF2) of the elastic modulus (YMF1) in the first direction to the elastic modulus (YMF2) in the second direction of 1 or more. In another example, the ratio (YMF1/YMF2) may be about 1.1 or more, 1.2 or more, 1.3 or more, 1.4 or more, 1.5 or more, 1.6 or more, 1.7 or more, or 1.8 or more, or may be 10 or less, 9 or less, 8 or less, 7 or less, 6 or less, 5 or less, 4 or less, 3 or less, 2.5 or less, 2 or less, 1.9 or less, 1.8 or less, or 1.8 or less.

The elastic modulus (YMF1) in the first direction may be in a range of about 2 to 10 GPa. In another example, the elastic modulus (YMF1) may be about 2.5 GPa or more, 3 GPa or more, 3.5 GPa or more, 4 GPa or more, or 4.5 GPa or more, or may also be about 9.5 GPa or less, 9 GPa or less, 8.5 GPa or less, 8 GPa or less, 7.5 GPa or less, 7 GPa or less, 6.5 GPa or less, 6 GPa or less, 5.5 GPa or less, or 5 GPa or less.

The ratio (YM1/YMF1) of the elastic modulus (YM1) of the polymer film in the first direction to the elastic modulus (YMF1) of the film (including the cured material layer/the base film or including the cured material layer/the base film/the planarization layer) in the first direction may be in the range of, for example, about 0.5 to 10. In another example, the ratio (YM1/YMF1) may be about 1 or more, or more than 1, or may also be 9 or less, 8 or less, 7 or less, 6 or less, 5 or less, 4 or less, 3 or less, 2 or less, or 1.5 or less.

The film (including the cured material layer/the base film or including the cured material layer/the base film/the planarization layer) may have a ratio (MSF1/MSF2) of a maximum stress (MSF1) in the first direction to a maximum stress (MSF2) in the second direction of 1.5 or more. In another example, the ratio (MSF1/MSF2) may be about 2 or more, or may be 10 or less, 9 or less, 8 or less, 7 or less, 6 or less, 5 or less, 4 or less, or 3 or less.

The maximum stress (MSF1) in the first direction may be in a range of about 50 to 200 MPa. In another example, the maximum stress (MSF1) may be about 55 MPa or more, about 60 MPa or more, about 65 MPa or more, about 70 MPa or more, about 75 MPa or more, about 80 MPa or more, about 85 MPa or more, about 90 MPa or more, or 95 MPa or more, or may also be about 190 MPa or less, about 180 MPa or less, about 170 MPa or less, about 160 MPa or less, about 150 MPa or less, about 145 MPa or less, about 140 MPa or less, about 135 MPa or less, about 130 MPa or less, about 125 MPa or less, about 120 MPa or less, about 115 MPa or less, about 110 MPa or less, about 105 MPa or less, 90 MPa or less, or about 80 MPa or less.

The ratio (MS1/MSF1) of the maximum stress (MS1) of the polymer film in the first direction to the maximum stress (MSF1) of the film (including the cured layer/the base film or including the cured material layer/the base film/the planarization layer) in the first direction may be in the range of, for example, about 0.5 to 10. In another example, the ratio (MS1/MSF1) may be about 1 or more, 1.5 or more, 2 or more, or 2.5 or more, or may also be 9 or less, 8 or less, 7 or less, 6 or less, 5 or less, 4 or less, or 3 or less.

As described above, the physical properties of the above-mentioned film are secured through the application of a base film having high optical, mechanical and/or thermal asymmetry, and this allows the film to secure physical properties that can be effectively applied to various applications.

For example, the film of the present application may have excellent flexibility. The film of the present application may exhibit, for example, the above-mentioned scratch resistance and/or surface hardness and simultaneously exhibit excellent flexibility. For example, the film may exhibit a maximum holding curvature radius of about 1 to 40 pi or so alone or in combination with another film. Here, the maximum holding curvature radius means a curvature radius at the time of being bent to the maximum without observing defects on the surface of the film when the film has been bent according to the Mandrel test according to ASTM D522 standard.

In another example, the curvature radius may be 1.5 pi or more, or may also be 38 pi or less or so, 36 pi or less or so, 34 pi or less or so, 32 pi or less or so, 30 pi or less or so, 28 pi or less or so, 26 pi or less or so, 24 pi or less or so, 22 pi or less or so, 20 pi or less or so, 18 pi or less or so, 16 pi or less or so, 14 pi or less or so, 12 pi or less or so, 10 pi or less or so, 8 pi or less or so, 6 pi or less or so, 4 pi or less or so, or 3 pi or less or so.

The thickness of the base film applied in the film of the present application is not particularly limited, and it may have a general thickness in consideration of the intended use.

The film of the present application as above can be applied to various uses. For example, the film can be applied to various optical applications.

Accordingly, the present application also relates to an optical laminate. The optical laminate may form an optical functional layer and the film formed on at least one side of the functional layer. In this case, the base film may be positioned adjacent to the functional layer compared to the cured material layer in the film.

Here, the type of the applicable optical functional layer is not particularly limited, and for example, a known polarization layer or retardation layer, and the like may be exemplified.

Advantageous Effects

The present application can provide a film having excellent optical characteristics such as transparency or haze, mechanical properties such as hardness, and flexibility, wherein the shape of the surface is controlled to be suitable for various uses, and the controlled surface shape has excellent durability.

MODE FOR INVENTION

Hereinafter, the scope of the present application will be described in more detail through examples, but the scope of the present application is not limited by the following examples.

1. Measuring Method of Haze

The haze was measured in accordance with JIS K 7136 standard by allowing light to enter the uneven surface of the film in a transmission mode method using a measuring instrument (manufacturer: MCRL, product name: HM-150).

2. Measuring Method of 60-Degree Gloss

The 60-degree gloss was measured in accordance with DIN EN ISO 2813 standard by allowing light to enter the uneven surface of the film using a measuring instrument (manufacturer: BYK, product name: BYK Micro Glossmeter·60.4561) in a reflection mode method.

3. Measuring Method of Arithmetic Mean Roughness Ra

The arithmetic mean roughness Ra of the uneven surface of the film or the like was identified in accordance with KS B 0601 or ISO 4287/1 standard using Nanosystem's optical profiler (model name: NV2700), and when the two standards did not match, it was identified according to KS B 0601 standard.

4. 500 g Steel Wool Resistance Evaluation

The steel wool resistance was evaluated using steel wool of grade #0000 sold by Liberon. Using a measuring instrument (manufacturer: Gibei NT, trade name: KM-M4360), the steel wool was brought into contact with the uneven surface of the film under a load of 500 g, and moved left and right to evaluate the steel wool resistance. At this time, the contact area was set to be approximately 2 cm and 2 cm or so in width and length (contact area: 4 cm$^2$), respectively. The movement was performed at a speed of about 60 times/min, and the movement distance was approximately 10 cm. The reflection was observed by visual observation and the steel wool test was performed until indentations, scratches or ruptures, and the like were confirmed.

5. Pencil Hardness Evaluation

Using a measuring instrument (manufacturer: Chungbuk Tech, trade name: Pencil Hardness Tester), the pencil hardness was measured according to JIS 5600 standard, while drawing the uneven surface of the film with a cylindrical pencil lead at a load of 500 g and an angle of 45 degrees and increasing the hardness of the pencil lead step by step until the occurrence of defects such as indentations, scratches or ruptures was confirmed. The speed of the pencil lead was about 1 mm/sec, and the movement distance was about 10 mm. This test was performed at a temperature of about 25° C. and 50% relative humidity.

6. GPC (Gel Permeation Chromatograph)

The number average molecular weight (Mn) and molecular weight distribution were measured using GPC (gel permeation chromatography). An analytical object substance such as a silicone resin component is placed in a 5 mL vial, and diluted in THF (tetrahydrofuran) to a concentration of about 1 mg/mL or so. Thereafter, the standard sample for calibration and the sample to be analyzed were filtered through a syringe filter (pore size: 0.45 μm) and then measured. Agilent technologies' ChemStation was used as the analysis program, the weight average molecular weight (Mw) and number average molecular weight (Mn) were obtained by comparing the elution time of the sample with the calibration curve, and the molecular weight distribution (PDI) was calculated by the ratio (Mw/Mn). The measurement conditions of GPC are as follows.

<GPC Measurement Conditions>

Instrument: 1200 series from Agilent technologies

Column: using 2 PLgel mixed B from Polymer laboratories

Solvent: THF

Column temperature: 35° C.

Sample concentration: 1 mg/mL, 200 μL injection

Standard sample: Polystyrene (Mp: 3900000, 723000, 316500, 52200, 31400, 7200, 3940, 485)

7. Evaluation of Tensile Characteristics and Coefficient of Thermal Expansion of the Film The elastic modulus (Young's modulus), elongation rate and maximum stress of the film were measured by applying force at room temperature (25° C.) with a tensile speed of 10 mm/min using UTM (Universal Testing Machine) equipment (Instron 3342) and performing a tensile strength test according to ASTM E831 standard. In this case, each specimen was cut to have a width of about 10 mm and a length of about 30 mm and manufactured, and the evaluation was performed after both ends in the longitudinal direction were each taped by 10 mm and fixed to the equipment. The coefficient of thermal expansion was measured in accordance with ASTM E831 standard by performing a length expansion test while increasing the temperature from 40° C. to 80° C. at a rate of 10° C./min using TMA (Thermomechanical Analysis) equipment (Metteler Toledo, SDTA840). During measurement, the length of the specimen in the measurement direction was 10 mm, and the load was set to 0.02N.

8. Skewness Measuring Method of Uneven Surface

The skewness of the uneven surface was identified according to ISO 25178 standard using Nanosystem's optical profiler (model name: NV2700). In the above process, Nanosystem's nanomap program was used as the program.

Preparation Example 1. Preparation of Film
Material P

Preparation of Silicone Resin Component p 3-acryloyloxypropyltrimethoxysilane (KBM5103, Shinetsu silicon), dimethyldimethoxysilane (DMDMS, Sigma-Aldrich), ethanol, water and TEA (triethyl amine) were uniformly mixed at room temperature at a molar ratio of 0.8:0.2:2.8:2.8:0.01 (KBM5103:DMDMS:ethanol:water: TEA), and reacted in a flask for about 12 hours while stirring at 80° C. to obtain a primary reactant. The number average molecular weight (Mn) of the prepared primary reactant was about 8341.38 g/mol or so, and the molecular weight distribution (Mw/Mn) was about 2.05 or so.

The primary reactant was maintained under a vacuum condition of about 70 Torr and at a temperature of 50° C. for about 3 hours or so. In this process, the temperature dropped to about 20° C. or so due to decompression. Subsequently, the temperature was raised to 80° C. and held for 30 minutes while maintaining the vacuum condition again, thereby allowing for additional polymerization and evaporation of the solvent (water) to obtain a silicone resin component p. The obtained silicone resin component p was a component represented by the following average unit formula A, where the number average molecular weight (Mn) was about 13426.63 g/mol and the molecular weight distribution (Mw/Mn) was about 2.34 or so.

$$(Me_2SiO_{2/2})_{0.2}(AcSiO_{3/2})_{0.8} \qquad \text{[Average Unit Formula A]}$$

In Average Unit Formula A, Me is a methyl group, and Ac is a 3-acryloyloxypropyl group.

Preparation of Solvent-Free Coating Liquid p

The above-prepared silicone resin component p was mixed with trimethylolpropane triacrylate (TMPTA) in a weight ratio of 9:1 (silicone resin component p: TMPTA), and about 2.5 parts by weight of a radical initiator (manufacturer: Dupont, product name: Igarcure819) relative to 100 parts by weight of the mixture was combined to prepare a solvent-free coating liquid p.

Preparation Example 2. Preparation of Film Material Q

Preparation of Silicone Resin Component q

It was prepared in the same manner as the silicone resin component p of Preparation Example 1, except that the reaction time was set to about 1 hour or so to obtain the primary reactant. The number average molecular weight (Mn) of the prepared primary reactant was about 1712.88 g/mol or so, and the molecular weight distribution (Mw/Mn) was about 1.63 or so.

The primary reactant was maintained under a vacuum condition of about 70 Torr and at a temperature of 50° C. for about 3 hours or so. In this process, the temperature dropped to about 20° C. or so due to decompression. Subsequently, the temperature was raised to 80° C. and held for 30 minutes while maintaining the vacuum condition again, thereby allowing for additional polymerization and evaporation of the solvent (water) to obtain a silicone resin component q. The obtained silicone resin component q was a component represented by the following average unit formula A, where the number average molecular weight (Mn) was about 2219.63 g/mol and the molecular weight distribution (Mw/Mn) was about 1.77 or so.

$$(Me_2SiO_{2/2})_{0.2}(AcSiO_{3/2})_{0.8} \qquad \text{[Average Unit Formula A]}$$

In Average Unit Formula A, Me is a methyl group, and Ac is a 3-acryloyloxypropyl group.

Preparation of Solvent-Free Coating Liquid q

The above-prepared silicone resin component q was mixed with trimethylolpropane triacrylate (TMPTA) in a weight ratio of 9:1 (silicone resin component q: TMPTA), and about 2.5 parts by weight of a radical initiator (manufacturer: Dupont, product name: Igarcure819) relative to 100 parts by weight of the mixture was combined to prepare a solvent-free coating liquid q.

Preparation Example 3. Preparation of Film Material R

Preparation of Silicone Resin Component r

Epoxycyclohexylethyltrimethoxysilane, dimethyldimethoxysilane (DMDMS, Sigma-Aldrich), ethanol, water and TEA (triethyl amine) were uniformly mixed at room temperature at a molar ratio of 0.8:0.2:2.8:2.8:0.01 (epoxycyclohexylethyltrimethoxysilane:DMDMS:ethanol:water: TEA), and reacted in a flask for about 24 hours while stirring at 70° C. to obtain a primary reactant.

The primary reactant was maintained under a vacuum condition of about 70 Torr and at a temperature of 50° C. for about 3 hours or so. In this process, the temperature dropped to about 20° C. or so due to decompression. Subsequently, the temperature was raised to 80° C. and held for 30 minutes while maintaining the vacuum condition again, thereby obtaining a silicone resin component r. The obtained silicone resin component r can be represented by the following average unit formula B.

$$(Me_2SiO_{2/2})_{0.2}(EpSiO_{3/2})_{0.8} \qquad \text{[Average Unit Formula B]}$$

In Average Unit Formula B, Me is a methyl group, and Ep is a 3,4-epoxycyclohexyl ethyl group.

Preparation of Solvent-Free Coating Liquid r

The prepared silicone resin r was mixed with an epoxy dimer 13 ((([3-ethyloxetane-3-yl]methoxy)methyl)oxane) (DOX, Toagosei) in a weight ratio of 6:4 (epoxy resin: DOX), and about 3 parts by weight of a cationic initiator (IK-1, San-Apro) relative to 100 parts by weight of the mixture was combined to prepare a solvent-free coating liquid r.

Preparation Example 4. Preparation of Anti-Glare Film (AG1 Film) for Mold

An anti-glare film for mold was prepared by coating, as a coating liquid, a coating liquid prepared by diluting a coating liquid comprising dipentaerythritol hexaacrylate of a non-urethane-based polyfunctional acrylate, silica particles having an average particle diameter (median particle diameter, D50 particle diameter) of about 1 μm, a fluorine-based slip agent (manufacturer: 3M, product name: FC4430) and a radical initiator (manufacturer: Dupont, product name: Igarcure819) in a weight ratio of 100:12:0.1:2 (non-urethane-based polyfunctional acrylate:silicaparticles:slipagent:radical initiator) in a solvent to a solid content of 50 wt % or so on a PET (poly(ethylene terephthalate)) base film (TA063, Toyobo) having a thickness of 100 μm, drying it at 80° C. for 2 minutes or so, and then irradiating it with ultraviolet rays at an energy of 1 J/cm$^2$ or so by an H bulb (Fusion). The arithmetic mean roughness Ra of the anti-glare surface of the prepared anti-glare film was in a level of 0.2 to 0.4 μm, and the 60-degree gloss was 45%. In addition, the skewness of the anti-glare surface was approximately 0.55 to 0.6 or so.

Preparation Example 5. Preparation of Anti-Glare Film (AG2 Film) for Mold

An anti-glare film was prepared in the same manner as in Preparation Example 2, except that as a coating liquid, a coating liquid prepared by diluting a coating liquid comprising dipentaerythritol hexaacrylate of a non-urethane-based polyfunctional acrylate, silica particles having an average particle diameter (median particle diameter, D50 particle diameter) of about 1 μm, a fluorine-based slip agent (manufacturer: 3M, product name: FC4430) and a radical initiator (manufacturer: Dupont, product name: Igarcure819) in a weight ratio of 100:9:0.1:2 (non-urethane-based polyfunctional acrylate:silicaparticles:slipagent:radical initiator) in a solvent to a solid content of 50 wt % or so was used. The arithmetic mean roughness Ra of the anti-glare surface of the film was in a level of 0.2 to 0.4 μm, and the 60-degree gloss was 65%. In addition, the skewness of the anti-glare surface was approximately 0.75 to 0.85 or so.

Example 1

In a PET (poly(ethylene terephthalate)) film in which a planarization layer having a thickness of about 40 μm was formed on one side, the solvent-free coating liquid p of Preparation Example 1 was coated to a thickness of about 40 μm or so on the side without the planarization layer. Toyobo's SRF film was used as the PET film. The in-plane retardation (Rin) of the SRF film was about 8,400 nm, and the thickness direction retardation (Rth) was about 9,200 nm. In addition, the coefficient of thermal expansion (CTE1), elastic modulus (YM1), maximum stress (MS1) and elongation rate (E1) of the SRF film in the TD direction were 27 ppm/K, 5.7 GPa, 199 MPa and 44.5%, respectively, and the coefficient of thermal expansion (CTE2), elastic modulus (YM2), maximum stress (MS2) and elongation rate (E2) in the MD direction were 67 ppm/K, 2.3 GPa, 81 MPa and 6.8%, respectively.

Subsequently, in a state where the anti-glare surface of the anti-glare film (AG2 film) of Preparation Example 5 was brought into contact on the coating layer (the coating layer formed on the opposite side of the planarization layer) so that bubbles or air layers were not mixed, the ultraviolet rays were irradiated at an energy of 2 J/cm² from a direction of passing through the anti-glare film to be irradiated to the coating layer, using a D bulb (Fusion), and further irradiated to the PET film side to prepare a film comprising a base film and a cured material layer. The uneven structure was integrally formed on the surface of the prepared cured material layer that had been in contact with the anti-glare surface. The haze measured for the uneven surface was about 5.2% or so, the 60-degree gloss was about 65.8% or so, and the arithmetic mean roughness Ra was about 0.26 μm or so. In addition, the steel wool resistance of the uneven surface was 10,000 times or more, and the pencil hardness was about 9H.

Meanwhile, the haze of the cured material uneven surface measured after performing the steel wool test 1,500 times in the aforementioned manner was about 5.6% or so, the 60-degree gloss was about 65.1% or so, and the arithmetic mean roughness Ra was about 0.29 μm or so.

Accordingly, ΔH, ΔG and ΔR in Equations 1 to 3 were about 0.027, 0.047 and 0.002, respectively.

In addition, the coefficient of thermal expansion (CTEF1), elastic modulus (YMF1), maximum stress (MSF1) and elongation rate (EF1) of the base film of the film (planarization layer/base film/cured material layer) in the TD direction were 42 ppm/K, 4.5 GPa, 76 MPa and 6.4%, respectively, and the coefficient of thermal expansion (CTEF2), elastic modulus (YMF2), maximum stress (MSF2) and elongation rate (EF2) in the MD direction were 87 ppm/K, 2.8 GPa, 33 MPa and 1.6%, respectively.

The skewness of the uneven surface in the optical profile was about −0.87 or so.

Example 2

In the same PET (poly(ethylene terephthalate)) film, in which the planarization layer was formed, as in Example 1, the solvent-free coating liquid p of Preparation Example 1 was coated to a thickness of about 20 μm on the side without the planarization layer. Subsequently, in a state where the anti-glare surface of the anti-glare film (AG1) of Preparation Example 4 was brought into contact on the coating liquid and pressed in the same manner as in Example 1, ultraviolet rays were irradiated at an energy of 4 J/cm² from the PET film side using a D bulb (Fusion) to prepare a film comprising a base film and a cured material layer. The uneven structure was integrally formed on the surface of the prepared cured material layer that had been in contact with the anti-glare surface. The haze measured for the uneven surface was about 21.4% or so, the 60-degree gloss was 46.2% or so, and the arithmetic mean roughness Ra was about 0.31 μm or so. In addition, the steel wool resistance of the uneven surface was 10,000 times or more, and the pencil hardness was about 9H.

Meanwhile, the haze of the cured material uneven surface measured after performing the steel wool test 1,500 times in the aforementioned manner was about 21.3% or so, the 60-degree gloss was 46.4% or so, and the arithmetic mean roughness Ra was about 0.34 μm or so.

Accordingly, ΔH, ΔG and ΔR in Equations 1 to 3 were about 0.007, 0.013 and 0.002, respectively.

In addition, the coefficients of thermal expansion, elastic moduli, maximum stresses and elongation rates of the base film of the film (planarization layer/base film/cured material layer) in the TD and MD directions were identified similarly to those of Example 1.

The skewness of the uneven surface in the optical profile was about −0.55 or so.

Example 3

Unlike Example 1, a PET (poly(ethylene terephthalate)) film without a planarization layer was applied. As the PET film, the same SRF film as in Example 1 was used. The solvent-free coating liquid p of Preparation Example 1 was coated on one side of the PET film to a thickness of about 20 μm or so. Subsequently, in a state where the anti-glare surface of the anti-glare film (AG2) of Preparation Example 5 was brought into contact on the coating liquid and pressed in the same manner as in Example 1, ultraviolet rays were irradiated at an energy of 2 J/cm² from the PET film side using a D bulb (Fusion) to prepare a film comprising a base film and a cured material layer. The uneven structure was integrally formed on the surface of the prepared cured material layer that had been in contact with the anti-glare surface. The haze measured for the uneven surface was about 5.1% or so, the 60-degree gloss was 66.1% or so, and the arithmetic mean roughness Ra was about 0.26 μm or so. In addition, the steel wool resistance of the uneven surface was 10,000 times or more, and the pencil hardness was about 8H.

Meanwhile, the haze of the cured material uneven surface measured after performing the steel wool test 1,500 times in the aforementioned manner was about 5.4% or so, the 60-degree gloss was 66.0% or so, and the arithmetic mean roughness Ra was about 0.31 μm or so.

Accordingly, ΔH, ΔG and ΔR in Equations 1 to 3 were about 0.02, 0.007 and 0.003, respectively.

In addition, the elastic modulus (YMF1), maximum stress (MSF1) and elongation rate (EF1) of the base film of the film (planarization layer/base film/cured material layer) in the TD direction were 4.8 GPa, 96 MPa and 4.4%, respectively, and the elastic modulus (YMF2), maximum stress (MSF2)

and elongation rate (EF2) in the MD direction were 2.6 GPa, 39 MPa and 1.9%, respectively.

The skewness of the uneven surface in the optical profile was about −0.75 or so.

Example 4

Unlike Example 1, a PET (poly(ethylene terephthalate)) film without a planarization layer was applied. As the PET film, the same SRF film as in Example 1 was used. The solvent-free coating liquid p of Preparation Example 1 was coated on one side of the PET film to a thickness of about 20 μm or so. Subsequently, in a state where the anti-glare surface of the anti-glare film (AG1) of Preparation Example 4 was brought into contact on the coating liquid and pressed in the same manner as in Example 1, ultraviolet rays were irradiated at an energy of 2 J/cm² from the PET film side using a D bulb (Fusion) to prepare a film comprising a base film and a cured material layer. The uneven structure was integrally formed on the surface of the prepared cured material layer that had been in contact with the anti-glare surface. The haze measured for the uneven surface was about 21.1% or so, the 60-degree gloss was 47.4% or so, and the arithmetic mean roughness Ra was about 0.32 μm or so. In addition, the steel wool resistance of the uneven surface was 10,000 times or more, and the pencil hardness was about 7H.

Meanwhile, the haze of the cured material uneven surface measured after performing the steel wool test 1,500 times in the aforementioned manner was about 21.2% or so, the 60-degree gloss was 46.9% or so, and the arithmetic mean roughness Ra was about 0.36 μm or so.

Accordingly, ΔH, ΔG and ΔR in Equations 1 to 3 were about 0.007, 0.033 and 0.003, respectively.

In addition, the elastic moduli, maximum stresses, and elongation rates of the base film of the film (planarization layer/base film/cured material layer) in the TD and MD directions were similar to those of Example 3, respectively.

The skewness of the uneven surface in the optical profile was about −0.58 or so.

Example 5

In the same PET (poly(ethylene terephthalate)) film, in which the planarization layer was formed, as in Example 1, the solvent-free coating liquid q of Preparation Example 2 was coated to a thickness of about 20 μm on the side without the planarization layer. Subsequently, in a state where the anti-glare surface of the anti-glare film (AG1) of Preparation Example 4 was brought into contact on the coating liquid and pressed in the same manner as in Example 1, ultraviolet rays were irradiated at an energy of 4 J/cm² from the PET film side using a D bulb (Fusion) to prepare a film comprising a base film and a cured material layer. The uneven structure was integrally formed on the surface of the prepared cured material layer that had been in contact with the anti-glare surface. The haze measured for the uneven surface was about 21.7% or so, the 60-degree gloss was 45.5% or so, and the arithmetic mean roughness Ra was about 0.34 μm or so. In addition, the steel wool resistance of the uneven surface was less than 3,000 times, and the pencil hardness was about 7H.

Meanwhile, the haze of the cured material uneven surface measured after performing the steel wool test 1,500 times in the aforementioned manner was about 22.0% or so, the 60-degree gloss was 44.7% or so, and the arithmetic mean roughness Ra was about 0.37 μm or so.

Accordingly, ΔH, ΔG and ΔR in Equations 1 to 3 were about 0.020, 0.053 and 0.002, respectively.

In addition, the coefficients of thermal expansion, elastic moduli, maximum stresses and elongation rates of the base film of the film (planarization layer/base film/cured material layer) in the TD and MD directions were identified similarly to those of Example 1.

The skewness of the uneven surface in the optical profile was about −0.59 or so.

Comparative Example 1

As a known coating liquid for forming an anti-glare layer, a coating liquid comprising 60 wt % or more of a non-urethane-based polyfunctional acrylate having an average functional group of bifunctionality or higher was coated to a thickness of about 15 μm or so on a TAC film (50 μm, a TAC film having a UV cut function from Fuji), maintained at a temperature of 80° C. for 2 minutes and dried, and then ultraviolet rays were irradiated at an energy of 1 J/cm² through Fusion's H bulb to form a surface having an uneven structure. The haze measured for the uneven surface was about 22.1% or so, the 60-degree gloss was 21.5% or so, and the arithmetic mean roughness Ra was about 0.32 μm or so. In addition, the steel wool resistance of the uneven surface was 500 times or less, and the pencil hardness was about 3H.

Meanwhile, the haze of the uneven surface measured after performing the steel wool test 1,500 times in the aforementioned manner was about 38.4% or so, the 60-degree gloss was 14.2% or so, and the arithmetic mean roughness Ra was about 83 μm or so.

Accordingly, ΔH, ΔG and ΔR in Equations 1 to 3 were about 1.087, 0.487 and 5.512, respectively.

The skewness of the uneven surface in the optical profile was about 0.33 or so.

Comparative Example 2

As a known coating liquid for forming an anti-glare layer, a coating liquid comprising 60 wt % or more of a non-urethane-based polyfunctional acrylate having an average functional group of bifunctionality or higher was coated on a TAC film (50 μm, a TAC film having a UV cut function from Fuji) to have a thickness of about 15 μm or so after complete drying, maintained at a temperature of 80° C. for 2 minutes and dried, and then ultraviolet rays were irradiated at an energy of 1 J/cm² through Fusion's H bulb to form a surface having an uneven structure. The haze measured for the uneven surface was about 28.2% or so, the 60-degree gloss was 19.6% or so, and the arithmetic mean roughness Ra was about 0.23 μm or so. In addition, the steel wool resistance of the uneven surface was 500 times or less, and the pencil hardness was about 3H.

Meanwhile, the haze of the uneven surface measured after performing the steel wool test 1,500 times in the aforementioned manner was about 40.1% or so, the 60-degree gloss was 14.6% or so, and the arithmetic mean roughness Ra was about 93 μm or so.

Accordingly, ΔH, ΔG and ΔR in Equations 1 to 3 were about 0.793, 0.333 and 6.185, respectively.

The skewness of the uneven surface in the optical profile was about 0.51 or so.

Comparative Example 3

In the same PET (poly(ethylene terephthalate)) film, in which the planarization layer was formed, as in Example 1, the solvent-free coating liquid r of Preparation Example 3 was coated to a thickness of about 20 μm on the side without the planarization layer. Subsequently, in a state where the anti-glare surface of the anti-glare film (AG1) of Preparation Example 4 was brought into contact on the coating liquid and pressed in the same manner as in Example 1, ultraviolet rays were irradiated at an energy of 4 J/cm² from the PET film side using a D bulb (Fusion) to prepare a film comprising a base film and a cured material layer. The uneven structure was integrally formed on the surface of the prepared cured material layer that had been in contact with the anti-glare surface. The haze measured for the uneven surface was about 23.5% or so, the 60-degree gloss was 46.1% or so, and the arithmetic mean roughness Ra was about 0.3 μm or so. In addition, the steel wool resistance of the uneven surface was less than 2,000 times, and the pencil hardness was about 6H.

Meanwhile, the haze of the cured material uneven surface measured after performing the steel wool test 1,500 times in the aforementioned manner was about 33.3% or so, the 60-degree gloss was 35.9% or so, and the arithmetic mean roughness Ra was about 5.58 μm or so.

Accordingly, ΔH, ΔG and ΔR in Equations 1 to 3 were about 0.653, 0.68 and 0.352, respectively.

In addition, the coefficients of thermal expansion, elastic moduli, maximum stresses and elongation rates of the base film of the film (planarization layer/base film/cured material layer) in the TD and MD directions were identified similarly to those of Example 1.

The skewness of the uneven surface in the optical profile was about −0.79 or so.

The invention claimed is:

1. A film comprising a base film and a cured material layer of an energy beam-curable composition formed on one side or both sides of the base film, wherein the energy beam-curable composition comprises a silicone resin component represented by the following average unit formula 1, $$(R^1_3SiO_{1/2})_a(R^2_2SiO_{2/2})_b(R^3SiO_{3/2})_c$$
$$(SiO_{4/2})_d(RO_{1/2})_e \qquad \text{[Average Unit Formula 1]}$$

wherein, $R^1$ to $R^3$ are each independently a hydrogen atom, an alkyl group, an aryl group or an energy beam-curable group, and when $R^1$ to $R^3$ exist plurally, they are each the same or different from each other, and at least one of $R^1$ to $R^3$ is an energy beam-curable group, and when a+b+c+d has been converted to 1, a, b, c and d satisfy 0≤a≤1, 0<b≤1, 0<c≤1 and 0≤d≤1, respectively, and e is a number in which e/(a+b+c+d) falls within a range of 0 to 0.4, and wherein the cured material layer has an uneven surface having a negative skewness according to ISO 25178 standard on at least one side thereof, wherein the uneven surface satisfies one or more of the following equations 1 to 3:

$$0.3 \geq \Delta H = 100 \times |(H_A - H_I)/N| \qquad \text{[Equation 1]}$$

$$0.3 \geq \Delta G = 100 \times |(G_A - G_I)/N| \qquad \text{[Equation 2]}$$

$$0.3 \geq \Delta R = 100 \times |(R_A - R_I)/N| \qquad \text{[Equation 3]}$$

wherein, ΔH, ΔG and ΔR are a change rate of haze, a change rate of 60-degree gloss and a change rate of arithmetic mean roughness (Ra) of the uneven surface, respectively;

in the Equation 1, $H_I$ is an initial haze of the uneven surface, $H_A$ is a haze of the uneven surface after performing a steel wool test, N is the number of times that the steel wool test has been performed, and $|(H_A - H_I)/N|$ is an absolute value of a numerical value obtained by putting the $H_A$, $H_I$ and N into $(H_A - H_I)/N$;

in the Equation 2, $G_I$ is an initial 60-degree gloss of the uneven surface, $G_A$ is a 60-degree gloss of the uneven surface after performing the steel wool test, N is the number of times that the steel wool test has been performed, and $|(G_A - G_I)/N|$ is an absolute value of a numerical value obtained by putting the $G_A$, $G_I$ and N into $(G_A - G_I)/N$; and in the Equation 3, $R_I$ is an initial arithmetic mean roughness (Ra) of the uneven surface, $R_A$ is an arithmetic mean roughness (Ra) of the uneven surface after performing the steel wool test, N is the number of times that the steel wool test has been performed, and $|(R_A - R_I)/N|$ is an absolute value of a numerical value obtained by putting the $R_A$, $R_I$ and N into $(R_A - R_I)/N$, and in the Equations 1 to 3, N is 1,500 times to 3,000 times.

2. The film according to claim 1, wherein the uneven surface satisfies two or more of the equations 1 to 3.

3. The film according to claim 1, wherein the uneven surface satisfies all of the equations 1 to 3.

4. The film according to claim 1, wherein the negative skewness of the uneven surface according to ISO 25178 standard is −2 or more and less than 0.

5. The film according to claim 1, wherein the energy beam-curable composition further comprises a reactive diluent.

6. The film according to claim 5, wherein the reactive diluent is an acrylate compound.

7. The film according to claim 5, wherein the energy beam-curable composition comprises 1 to 200 parts by weight of a reactive diluent relative to 100 parts by weight of the silicone resin component.

8. The film according to claim 1, wherein the silicone resin component has a weight average molecular weight in a range of 10,000 to 50,000.

9. The film according to claim 1, wherein the silicone resin component has a molecular weight distribution of 1.8 or more.

10. The film according to claim 1, wherein the uneven surface has a pencil hardness of 5H or more.

11. The film according to claim 1, wherein the uneven surface has 500 g steel wool resistance of 1,500 times or more.

12. The film according to claim 1, wherein the uneven surface has a haze in a range of 3% to 50%.

13. The film according to claim 1, wherein the uneven surface has an arithmetic mean roughness Ra in a range of 0.01 μm to 2 μm.

14. The film according to claim 1, wherein the uneven surface has a 60-degree gloss in a range of 10% to 90%.

15. The film according to claim 1, wherein the film has a ratio (CTEF2/CTEF1) of a coefficient of thermal expansion (CTEF1) in a first direction and a coefficient of thermal expansion (CTEF2) in a second direction perpendicular to the first direction is 1.5 or more.

16. The film according to claim 1, wherein the film has a ratio (YMF1/YMF2) of an elastic modulus (YMF1) in a first direction to an elastic modulus (YMF2) in a second direction perpendicular to the first direction is 1.1 or more.

17. The film according to claim 1, wherein the film has a ratio (MSF1/MSF2) of a maximum stress (MSF1) in a first direction to a maximum stress (MSF2) in a second direction perpendicular to the first direction is 1.5 or more.

18. The film according to claim 1, wherein the film has a ratio (EF1/EF2) of an elongation rate (EF1) in a first direction to an elongation rate (EF2) in a second direction perpendicular to the first direction is 1.5 or more.

19. An optical laminate comprising an optical functional layer and the film of claim 1 formed on one side of the optical functional layer.

\* \* \* \* \*